United States Patent [19]

Mitchell et al.

[11] Patent Number: 5,710,727
[45] Date of Patent: Jan. 20, 1998

[54] SYSTEM AND METHOD FOR CREATING RESOURCES IN AN INSTRUMENTATION SYSTEM

[75] Inventors: Bob Mitchell; Hugo Andrade, both of Austin; Jogen Pathak, Dallas; Samson DeKey, Austin; Abhay Shah, Austin; Todd Brower, Austin, all of Tex.

[73] Assignee: National Instruments Corporation, Austin, Tex.

[21] Appl. No.: 544,286

[22] Filed: Oct. 17, 1995

Related U.S. Application Data

[63] Continuation-in-part of Ser. No. 238,480, May 4, 1994, and Ser. No. 438,438, May 10, 1995.
[51] Int. Cl.$^6$ ................................................. G06F 19/00
[52] U.S. Cl. ................................... 364/579; 395/674
[58] Field of Search .......................... 364/579, 580, 364/191; 395/62, 500, 700, 970, 674, 681–685

[56] References Cited

U.S. PATENT DOCUMENTS

| | | | |
|---|---|---|---|
| 5,337,262 | 8/1994 | Luthi et al. | 364/580 |
| 5,359,546 | 10/1994 | Hayes et al. | 364/579 |
| 5,361,336 | 11/1994 | Atchison . | |
| 5,390,325 | 2/1995 | Miller | 395/575 |

OTHER PUBLICATIONS

Marketing brochures and product literature for instrumentation systems produced by Bruel & Kjaer, including the Modular Test System Type 3538, available at the Auto TestCon instrumentation conference in 1991.

Slide presentation on the Bruel & Kjaer Modular Test system.

*Hewlett Packard SICL Standard Instrument Control Library for C Programming*, Lee Atchison, VXI Systems Divison, Hewlett Packard Company, Jan. 21, 1994, Revision 3.9, pp. i–iii, i–iii, 1–136, Index.

*Primary Examiner*—James P. Trammell
*Attorney, Agent, or Firm*—Conley, Rose & Tayon; Jeffrey C. Hood

[57] ABSTRACT

A system and method for developing instrument drivers and applications in a computer-based instrumentation system. The present invention provides simplified application development and improved performance for instrumentation systems. The instrumentation system of the present invention provides a plurality of instrument control resources which are used as building blocks to create instrument drivers and higher level applications. The present invention also uses object oriented technology which allows device resources to be easily combined to create higher level applications. The present invention is independent of I/O interface type, operating system, and programming language while also providing a common look and feel and consistent API to the user. A developer creates a resource in the VISA system by first determining if the desired resource can inherit from a currently existing resource. If the resource desired to be created can inherit from an existing resource, then the developer creates session and resource classes from the base classes that are being inherited from. If the developer determines that a resource does not currently exist from which the resource can inherit, then the developer inherits from the base session and resource classes provided in a VISA system. After either of the above steps, the developer creates an interface description language for the resource and session classes that have been created for the resource. The interface description language describes the interface for the session and resource classes created for the session. The developer then creates the code which supplements and/or overwrites the code in the existing resource that was inherited from. The code is created to provide operations, attributes, and events for the new resource. Once the code has been created and debugged, then a resource has been created for controlling the particular instrument. In a similar manner, various other types of instrument drivers in higher level instrumentation applications can be created by inheriting from existing resources.

44 Claims, 22 Drawing Sheets

Microfiche Appendix Included
(5 Microfiche, 405 Pages)

Example VISA Configuration

Example VISA Distributed Configuration

VISA Resource Classes vs. VISA Resources

SYSTEM AND METHOD FOR CREATING RESOURCES IN AN INSTRUMENTATION SYSTEM

CONTINUATION DATA

This is a continuation-in-part of-co-pending application Ser. No. 08/238,480 titled "Method and Apparatus for Controlling an Instrumentation System" filed May 4, 1994, whose inventors were Bob Mitchell, Hugo Andrade, Jogen Pathak, Samson DeKey, Abhay Shah, and Todd Brower, and which was assigned to National Instruments Corporation.

This is also a continuation-in-part of co-pending application Ser. No. 08/438,438 titled "System and Method for Handling Events in an Instrumentation System" filed May 10, 1995, whose inventors were Abhay Shah, Jogen Pathak, Bob Mitchell, Hugo Andrade, Samson DeKey, and Todd Brower, and which was assigned to National Instruments Corporation.

A microfiche appendix is included in the application. It contains 5sheets and 405 fynmes.

FIELD OF THE INVENTION

The present invention relates to driver level control software for instrumentation systems, and more particularly to a system and method for creating resources, including instrument driver resources, in an instrumentation system.

DESCRIPTION OF THE RELATED ART

An instrument is a device which collects data or information from an environment or unit under test and displays this information to a user. An instrument may also perform various data analysis and data processing on acquired data prior to displaying the data to the user. Examples of various types of instruments include oscilloscopes, digital multimeters, pressure sensors, etc., and the types of information which might be collected by respective instruments include voltage, resistance, distance, velocity, pressure, frequency of oscillation, humidity or temperature, among others.

In the past, many instrumentation systems comprised individual instruments physically interconnected with each other. Each instrument typically included a physical front panel with its own peculiar combination of indicators, knobs, or switches. A user generally had to understand and manipulate individual controls for each instrument and record readings from an array of indicators. Acquisition and analysis of data in such instrumentation systems was tedious and error prone.

A significant advance occurred with the introduction of computers to provide more flexible means for interfacing instruments with a user. In such computerized instrumentation systems, the user interacts with software executing on the computer system through the computer's video monitor rather than through a manually operated front panel to control one or more real world instruments. The software executing on the computer system can be used to simulate the operation of an instrument in software or to control or communicate with one or more real world instruments, these software created/controlled instruments being referred to as virtual instruments.

Therefore, modem instrumentation systems are moving from dedicated stand-alone hardware instruments such as oscilloscopes, digital multimeters, etc., to a concept referred to as virtual instrumentation. Virtual instrumentation comprises general purpose personal computers and workstations combined with instrumentation software and hardware to build a complete instrumentation system. In a virtual instrumentation system, a virtual instrument operating on a central computer controls the constituent instruments from which it acquires data which it analyzes, stores, and presents to a user of the system. Computer control of instrumentation has become increasingly desirable in view of the increasing complexity and variety of instruments available for use, and computerized instrumentation systems provide significant performance efficiencies over earlier systems for linking and controlling test instruments.

The various hardware interface options currently available for instrumentation systems can be categorized into four distinct types, including IEEE 488-controlled instruments (GPIB instruments), VXI bus instruments, plug-in data acquisition (DAQ) boards, and RS-232-controlled (serial) instruments. Background on these various hardware interface options is deemed appropriate.

The GPIB (general purpose interface bus) began as a bus designed by Hewlett-Packard in 1965, referred to as the Hewlett-Packard Interface Bus (HPIB), to connect their line of programmable instruments to their computers. National Instruments Corporation expanded the use of this bus to computers manufactured by companies other than Hewlett-Packard and hence the name General Purpose Interface Bus (GPIB) became more widely used than HPIB. The GPIB interface bus gained popularity due to its high transfer rates and was later accepted as IEEE standard 488-1975, and the bus later evolved to ANSI/IEEE standard 488.1-1987. In order to improve on this standard, two new standards were dried, these being ANSI/IEEE 488.2-1987 and the SCPI (Standard Commands for Programmable Instruments) standard. The IEEE 488.2 standard strengthened the original standard by defining precisely how controllers and instruments communicated. The IEEE 488.2 standard removed ambiguities of the IEEE 488.1 standard by defining data formats, status reporting, a message exchange protocol, IEEE 488.2 controller requirements, and common configuration commands to which all IEEE 488.2 instruments must respond in a precise manner. Thus, the IEEE 488.2 standard created more compatible, more reliable systems that were simpler to program. In 1990, a new specification was developed referred to as the Standard Commands for Programmable Instruments (SCPI), which used the command structures defined in the IEEE 488.2 standard and formed a single, comprehensive programming command set that is used with any SCPI instrument. The SCPI standard simplified the programming process for manufacturers and users alike. Rather than having to learn a different command set for each instrument, the user could focus on solving the measurement tests of his or her application, thus decreasing programming time.

The VXI (VME extension for Instrumentation) bus is a platform for instrumentation systems that was first introduced in 1987 and was originally designed as an extension of the VME bus standard. The VXI standard has experienced tremendous growth and acceptance around the world and is used in a wide variety of traditional test and measurement and ATE applications. The VXI standard uses a mainframe chassis with a plurality of slots to hold modular instruments on plug-in boards. The VXI architecture is capable of interfacing with both message based instruments and register based instruments. A message based instrument is an instrument which is controlled by a string of ASCII characters, whereas a register based instrument is controlled by writing a bit stream of1's and0's directly to registers in the instrument hardware.

An instrumentation system using a data acquisition interface method typically includes transducers which sense physical phenomena from the process or unit under test and provide electrical signals to data acquisition hardware inside the computer system. The electrical signals generated by the transducers are converted into a form that the data acquisition board can accept, typically by signal conditioning logic positioned between the transducers and the data acquisition card in the computer system. A computer can also control an instrumentation system through the computer's serial or RS-232 port. There are currently thousands of instruments with an RS-232 interface.

Due to the wide variety of possible testing situations and environments, and also the wide array of instruments available, it is often necessary for a user to develop a program to control respective instruments in the desired instrumentation system. Therefore, implementation of such systems frequently requires the involvement of a programmer to develop software for acquisition, analysis and presentation of instrumentation data.

The software architecture for a virtual instrumentation system comprises several components. The top level of the software architecture typically comprises an applications program used for high level control of the virtual instrument. Examples of high level applications programs for instrumentation control are LabVIEW and LabWindows from National Instruments Corp. Other examples of applications programs are HP VEE from Hewlett-Packard and Wavetest from Wavetek Corp. among others. These applications programs provide a user with the tools to control instruments, including acquiring data, analyzing data, and presenting data.

The applications programs mentioned above typically operate in conjunction with one or more instrument drivers to interface to actual physical instruments. For example, the LabVIEW and LabWindows applications software each include instrument libraries comprising drivers for more than three hundred GPIB, VXI, and RS-232 instruments from numerous manufacturers. The instrument drivers are designed to reduce a user's application development time by providing intuitive high level functions that relieve the user of complex low level instrument programming.

A software level referred to as driver level software is below the instrument driver level. Driver level software is used to interface the commands in the instrument driver to the actual hardware interface being used, such as a GPIB interface card, a data acquisition card, or a VXI card. In other words, driver level software handles the details of communication, i.e., the transfer of commands and data, over a physical connection between the computer and instruments. There have been many implementations of I/O control software, some of which were custom-developed by end users, while others were developed by vendors and sold along with interface hardware. Examples of driver level software include NI-488, NI-DAQ, and NI-VXI driver level software offered by National Instruments, Inc., which have become a de facto standard in the industry. Another example of driver level software is the Standard Instrument Control Library (SICL) offered by Hewlett-Packard.

A primary problem with traditional driver level software is that there generally is no common look and feel and no common programming constructs. Because of various inconsistencies in driver level software, developers of instrument driver software, who many times are non-professional software engineers, typically do not use the full platform capabilities available, such as interrupt handling, register based control, and triggers. Further, developers of instruments driver software often do not include centralized management of resources, and thus instrument drivers may conflict. As a result, various implementations of instrument driver software do not use the full functionality of the instrument being controlled. Also, there is no common creation mechanism or requirements, no common source code and no common testing criteria.

One important requirement of I/O control software is referred to as I/O interface independence. When users write application software to control a specific set of instruments, they typically want their applications to work with a variety of hardware for a respective I/O interface, perhaps even supplied from different vendors. A user controlling GPIB instruments with a PC, for example, may want to use a plug-in GPIB card in one application and use an external SCSI-to-GPIB interface box in another application. A consistent I/O software interface for these two approaches would allow the user to do this without modifying his application software code.

Another aspect of interface independence has become of interest to more and more users, especially those who are using VXI technology. Rather than simply developing software that is hardware independent for a respective I/O interface, i.e., software for a particular GPIB instrument that is independent of the computer-to-GPIB interface hardware used, many users desire the ability to write software that is also independent of the type of I/O interface used, such as whether GPIB, VXI, serial or some other type of connection is used between the computer and the instrument. For example, a user may want to write one piece of software to control an instrument that has options for both GPIB and RS-232 control. As another example, a user may want to write software to control a VXI instrument and have that software work whether the computer is embedded in the VXI chassis, connected to VXI through the MXI bus, or connected to VXI through a GPIB-to-VXI translator.

Therefore, instrumentation programmers desire the ability to write software that is independent of hardware, operating system and I/O interface. It is also greatly desirable for the software API of an instrumentation system to have a common look and feel as well as more consistent implementations for cross-platform development and integration, cross-product development and integration, and the reusability of source code. Also, the new I/O control software architecture should not only provide access to new capabilities, but must also bridge with the past and provide a smooth migration path for the installed base and huge investment in existing systems.

One attempt to create a driver level software layer that is I/O interface independent is the Standard Instrument Control Library (SICL) developed by Hewlett-Packard Corp. SICL uses a methodology of creating APIs with interface independence that includes a purely top-down approach which merges the capabilities of a group of hardware interfaces into a two-piece API. The first element of the API includes the overlap between all of the interfaces, referred to as the core, and the second element is the set of all of the interface-specific routines.

One drawback to the SICL I/O Library is that SICL is not object-oriented, and thus applications and/or instrument drivers cannot be created which derive or inherit functionality from different types or different objects. This limits the use of SICL in creating higher level applications, such as instrument drivers and other test and measurement applications.

Therefore, an improved system and method is desired for controlling instrumentation systems and for providing a user or developer with the capability to develop instrument drivers and application software for controlling instrumentation systems. An instrument driver development system is desired which is independent of I/O interface type, operating system, and programming language while also providing a common look and feel and consistent API to the user.

SUMMARY OF THE INVENTION

The present invention comprises a system and method for developing instrument drivers and applications in an instrumentation system. The present invention provides simplified application development and improved performance for instrumentation systems.

The instrumentation system of the present invention provides a plurality of instrument control resources which are used as building blocks to create instrument drivers and higher level applications. The present invention utilizes a device resource independence approach whereby the individual capabilities of devices are broken down into a plurality of objects called resources, and these resources are then used to develop instrument drivers or instrument control applications. The present invention also uses object oriented technology which allows device resources to be easily combined to create higher level applications. The present invention is independent of I/O interface type, operating system, and programming language while also providing a common look and feel and consistent API to the user. Thus the present invention provides a single I/O interface or library which enables a user to control all types of instruments using any of the various types of I/O interfaces. Due to its object oriented nature, the present invention can operate transparently in distributed environments.

The preferred embodiment of the invention includes a VISA Object Manager which provides capabilities to control and manage objects, wherein an object is an instance of a class. The VISA Object Manager includes important capabilities, such as the registration of interface definitions, the creation and destruction and objects, characteristic control, and operation invocation. The interface registration services are used to register interface descriptions for classes of objects. The life cycle service is used by a client application to create and destroy objects and also to free up associated system resources whenever a client uninitializes the environment. The characteristic control services are used to get or set the value of an attribute if that attribute is exported by an object. The operation invocation service allows the objects to communicate with one another by invoking operations. This service also provides mechanisms to report the completion status of operations. The VISA Object Manager thus comprises an object management environment and a base class definition referred to as the ViObject class. All other classes in the VISA system of the present invention inherit functionality from the ViObject class.

The present invention includes a plurality of instrument control resource classes. The resource classes each represent the smallest, logical, divisible capability of an instrument, and these resource classes act as building blocks for user applications and instrument drivers. A resource class generally is a definition of a particular capability of a device (such as read, write, trigger, poll, service request, etc.). A resource class is also the specific definition of how to create a resource, i.e., a template for the creation of resources. Each resource performs one or more operations and includes one or more attributes.

A resource is a particular implementation or instance of a resource class which abstracts the functionality of an instrument device capability. More particularly, a resource is the particular instance of an instrument control resource class for a specific capability of a specific device in the system (e.g. a GPIB read port of a GPIB device at primary address 5). Resources fall into one of two general types, these being a basic resource and a compound resource. A basic resource is a wholly contained software module that does not require other resources for operation. A compound resource is a software module that utilizes one or more basic and/or compound resources to provide a higher level of operation. Thus the preferred embodiment includes a grouping of resource classes referred to as the instrument control resource classes for controlling GPIB, VXI, and serial instruments as well as data acquisition boards.

The present invention further includes a resource referred to as the INSTR resource. The INSTR resource is a combination of resources which model the functionality of an instrument. For example, in one embodiment, the INSTR resource comprises read, write, trigger, poll, and clear services. The INSTR resource may comprise other groupings of resources to provide various types of instrument functionality. The INSTR resource comprises the fundamental building block for instrumentation control applications.

A session is a term used to designate a communication channel between a user's application and a resource. A session describes and implements the behavior of individual connections to resources. In essence, a session is an instance of a session class, much the same way a resource is an instance of a resource class. Resources can have multiple sessions open to them. In addition, a resource can control one or more other resources.

The preferred embodiment of the present invention includes a plurality of VISA Templates that operate as base classes from which resources receive their interface. The VISA Templates comprise a precisely defined extensible interface which provide a well-defined set of services. In general, each VISA resource derives its interface from the template set that provides standard services for the resource. The VISA Templates provide basic services, including session termination control, local/global attribute management, access control, and basic communication services, such as operation invocation, and event reporting. The VISA Templates also define various communications services among resources and between applications and resources through operation invocation and the exchange of information through events.

The VISA Resource Manager derives its interface from the VISA Resource and Session Templates and is responsible for managing, controlling, and distributing resources within the system, including the instrument control resources. The VISA Resource Manager shields resource implementations from having to know about most details of resource management and distribution of instrument control resources within a system.

Applications use the VISA Resource Manager to create sessions with particular resources within a system. The VISA Resource Manager presents a common interface to all instrument control resources in the system regardless of their physical location. The VISA Resource Manager includes the following responsibilities: registration of resources (from the system point of view), un-registration of resources, locating resources (location search), and management of session creation, among others. The VISA Resource Manager includes an API for these management needs, and all defined resources may use these capabilities.

The VISA Resource Manager allows a user to open a session to any resource in the system, including only single device capabilities such as a single trigger line or single write port on a device. In one embodiment of the invention, the instrument control resources include a resource referred to as the VISA Instrument Control Organizer Resource (VICO) which allows for the creation of user-defined resource groupings (virtual instruments) of the instrument control resources. A virtual instrument, in this context, is a name given to a unique session to a resource to provide the functionality of a traditional, stand-alone instrument. VICO is included in this embodiment to provide a higher level user interface so that users can communicate with instrumentation at a higher level of abstraction. VICO is a resource similar to other resources in the system, but is unique, however, in the sense that it serves only one unique service specifically for the instrument control resources. Thus VICO encapsulates features of the resources for users who desire a simple interface.

An instrumentation system according to the preferred embodiment also includes various utilities for installation and configuration, including a startup resource manager, a VISA Interactive Control utility for investigating the system, a configuration utility, a monitor utility, a resource generation utility, and an install utility.

At startup of the system, a method is invoked which configures the instrumentation system. This method involves determining the respective hardware and instruments available within the system as well as determining the logical address of the respective instruments in this system. The method determines the classes available within the system and uses the determined classes and the hardware configuration to create or instantiate resources. These newly created resources are then registered with the VISA Resource Manager so that the VISA Resource Manager is aware of their presence. The registration process comprises providing entry points of the resource to the VISA Resource Manager, including a description of the operation, a description of the attributes, a description of the exit conditions, the location of the files, and a description of the files themselves. Due to the hierarchical nature in which some resources use other resources for their operation, the instantiation and registration process may require the creation and instantiation of other resources.

Once a plurality of resources have been created and registered with the VISA Resource Manager, these resources can be used to create instrument control applications and/or to create other resources. In the present disclosure, the user of a VISA system can either be a client or developer. A client uses the resources in a VISA system to create applications, such as instruments drivers, that are not themselves resources. A developer, on the other hand, uses resources as a client or incorporates functionality from the resources available in a VISA system to create higher level applications that are resources. The developer can create a higher level resource that uses other resources, much the same way that a client uses resources, or the developer can create a higher level resource that incorporates or inherits functionality from one or more resources. As an example of a higher level resource, a developer can develop a base resource that embodies all of the functionality of a type of instrument, i.e., a class of instruments of a certain type. Resources may then be constructed to control specific instruments of that type, wherein these resources inherit or derive from the base resource and thus share a common interface.

In one embodiment, a developer creates a resource in the VISA system by first determining if the desired resource can inherit from a currently existing resource. If the resource desired to be created can inherit from an existing resource, then the developer creates session and resource classes from the base classes that are being inherited from. For example, if the user is attempting to create a voltmeter instrument driver for a particular type of voltmeter, and a base voltmeter class currently exists, the user preferably creates session and resource classes for the voltmeter instrument driver from the base voltmeter class that exists. If the developer determines that a resource does not currently exist from which the resource can inherit, then the developer inherits from the base session and resource classes provided in a VISA system.

After either of the above steps, the developer uses an interface description language to specify the resource and session classes that have been created for the resource. The interface description language describes the interface for the session and resource classes created for the session. The developer then creates the code which supplements and/or overwrites the code in the existing resource that was inherited from. The code is created to provide operations and attributes for the new resource. Once the code has been created and debugged, then a resource has been created for controlling the respective instrument. In a similar manner, various other types of instrument drivers and/or higher level instrumentation applications can be created by inheriting or deriving functionality from existing resources.

Therefore, the present invention comprises a system and method for constructing instrument drivers and other instrumentation control resources. This allows for greater flexibility and greater reusability of code as well as simplified driver and/or application development.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Incorporation by Reference

U.S. patent application Ser. No. 08/238,480 titled "Method and Apparatus for Controlling an Instrumentation System" filed May 4, 1994, whose inventors were Bob Mitchell, Hugo Andrade, Jogen Pathak, Samson DeKey, Abhay Shah, and Todd Brower, and which was assigned to National Instruments Corporation, is hereby incorporated by reference in its entirety as though fully set forth herein, including the appendices therein. The above-referenced patent application discloses a system referred to as the Virtual Instrument Software Architecture (VISA), which is being formulated as IEEE standard 1226.5 and VXI Plug&Play specification VPP 4.1.

U.S. patent application Ser. No. 08/438,438 titled "System and Method for Handling Events in an Instrumentation System" filed May 10, 1995, whose inventors were Abhay Shah, Jogen Pathak, Bob Mitchell, Hugo Andrade, Samson DeKey, and Todd Brower, and which was assigned to National Instruments Corporation, is hereby incorporated by reference in its entirety.

Appendix

The Virtual Instrument Software Architecture (VISA) specification, version 5.0, dated Oct. 13, 1995, which is included as microfiche Appendix 1 to the present application, forms a part of this application as though fully and completely set forth herein. This specification is also incorporated by reference as though fully and completely set forth herein. Appendix 1 is included as a microfiche appendix to the present application.

Instrumentation I/O Interface Options

Figure 1:
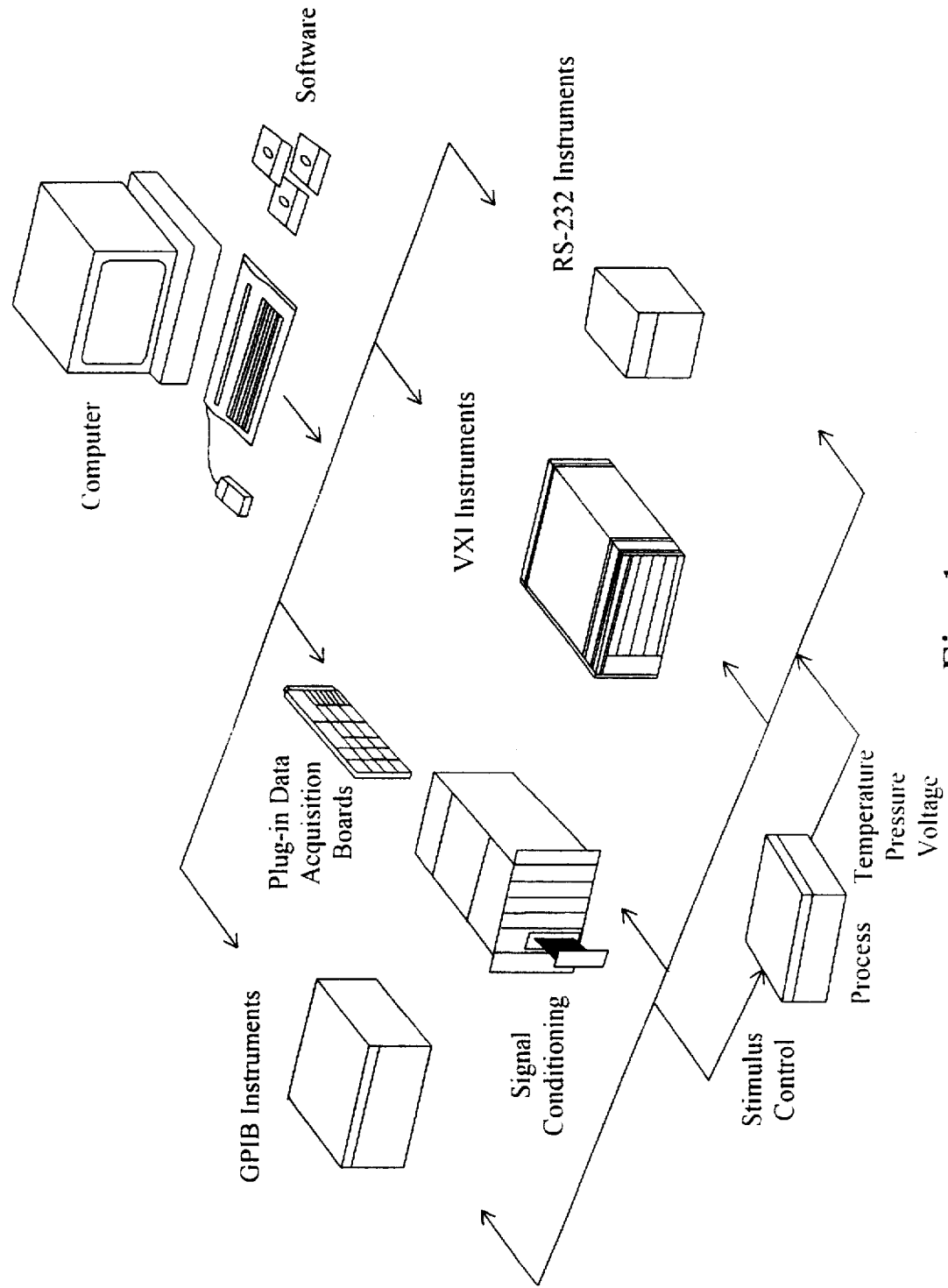
FIGS. 1 and 2 illustrate representative instrumentation control systems of the present invention including various I/O interface options.
Figure 2:
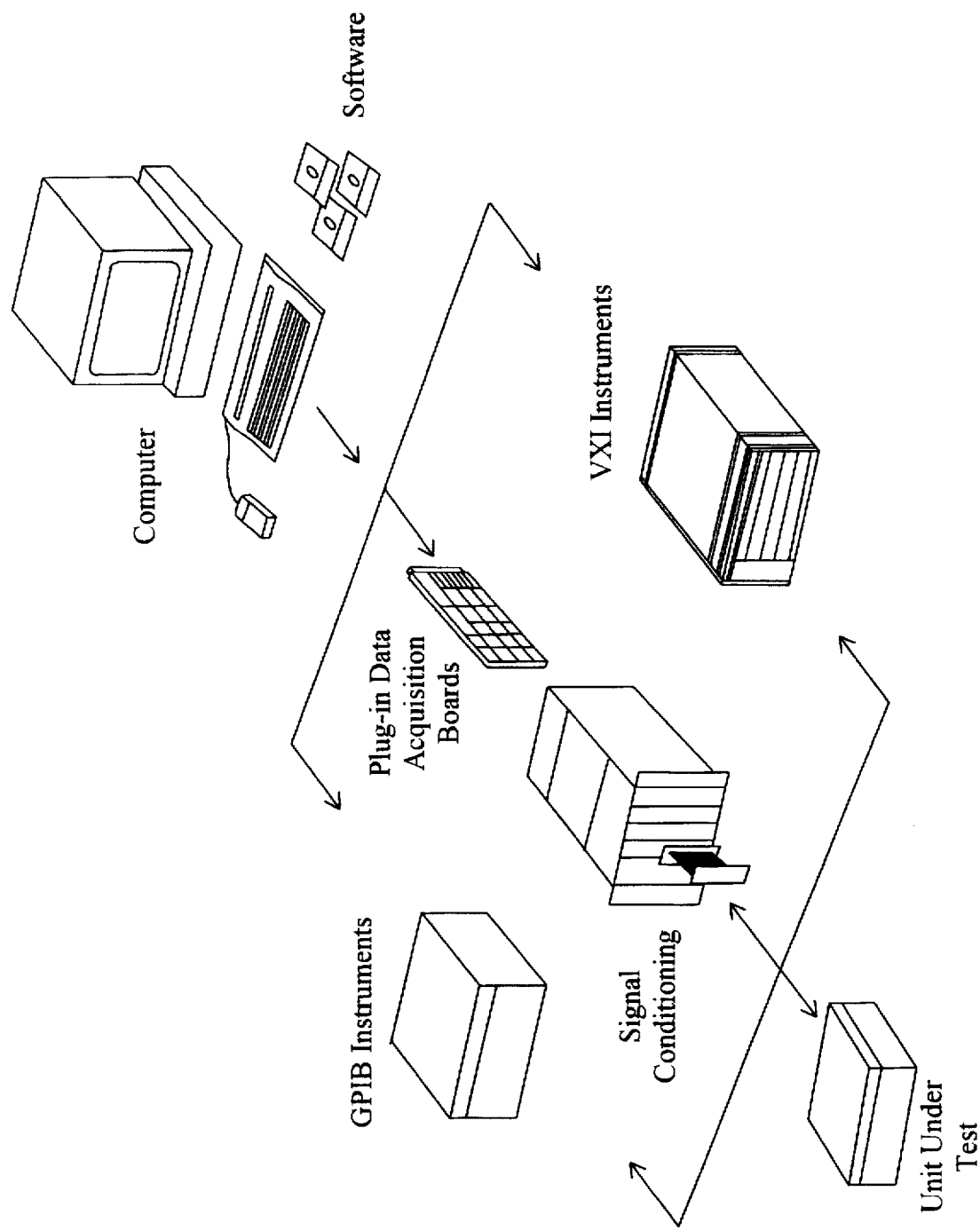

Referring now to FIGS. 1 and 2, the various hardware I/O interface options currently available for instrumentation systems are shown. FIG. 1 illustrates the choices available in a data acquisition and control application, and FIG. 2 illustrates the choices available in a test and measurement application. As shown, a computer system can interface with a process or unit under test using a number of methods, including IEEE 488-controlled instruments (GPIB instruments), plug-in data acquisition (DAQ) boards, RS-232-controlled (serial) instruments, and VXI bus instruments. In the present disclosure, the term "instrument" is used to refer to "traditional" instruments such as GPIB instruments and RS-232 instruments, as well as VXI bus instruments configured as plug-in cards to a VXI backplane. The term "instrument" is also used to refer to a data acquisition board in a computer system. In addition, the term instrument also refers to "virtual instruments" (combinations of hardware and/or software instruments) executing on a computer system, including VISA resources. In addition, the term "instrumentation system" is used herein to refer to test and measurement systems as well as process control and modeling systems, among others.

Computer System Block Diagram

Figure 3:
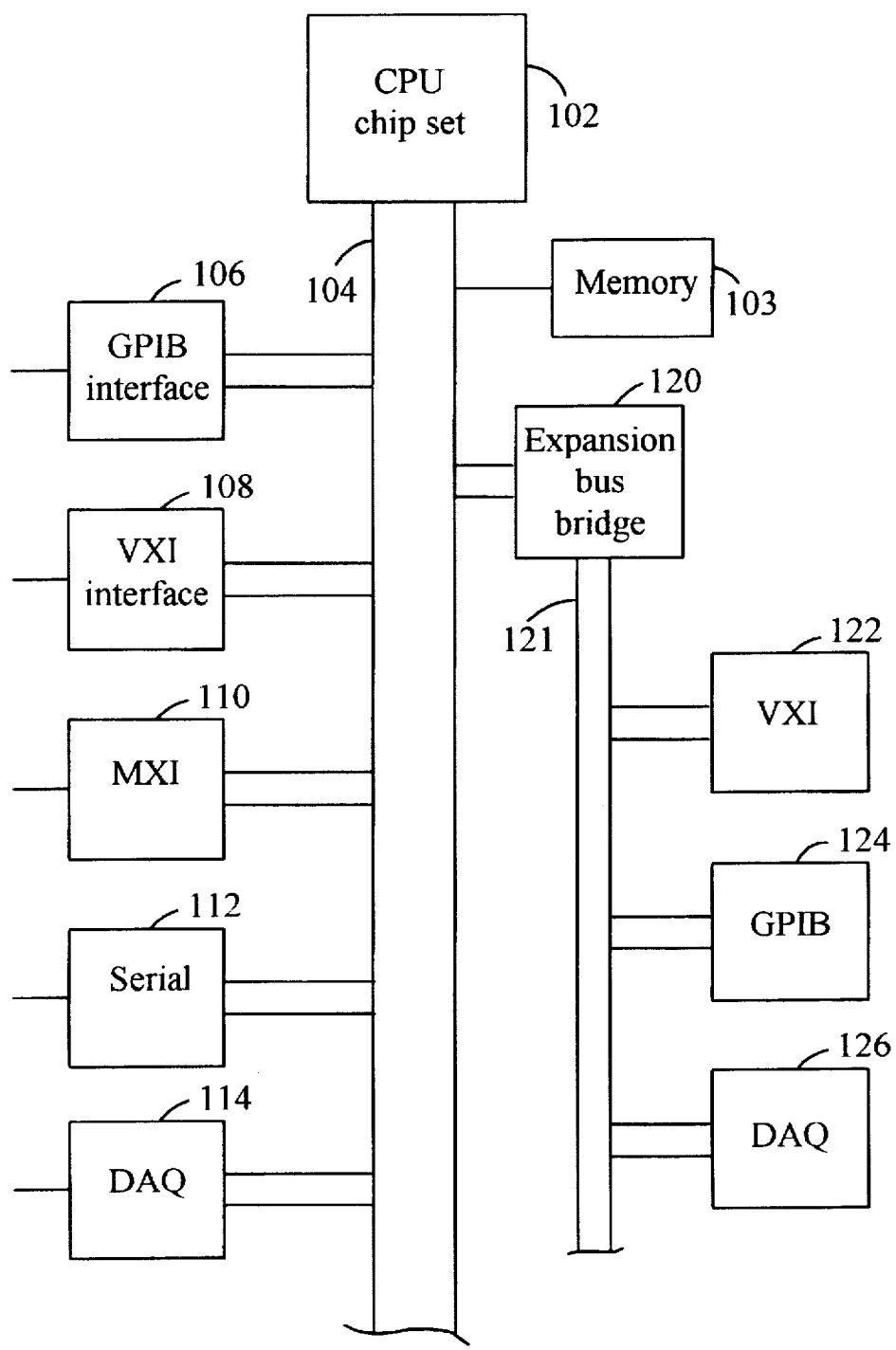
FIG. 3 is a block diagram of a computer system used to control an instrumentation system.

Referring now to FIG. 3, a block diagram of the computer system illustrated in FIGS. 1 and 2 is shown. It is noted that any type of computer system configuration can be used as desired, and FIG. 3 illustrates a representative embodiment. It is also noted that the computer system may be a general purpose computer system as shown in FIGS. 1 and 2, a computer implemented on a VXI card installed in a VXI chassis, or other types of embodiments.

As shown, the computer system includes a central processing unit (CPU) 102 which includes a CPU bus 104. The computer system also includes a memory 103 for storing various software elements of the present invention. The CPU bus 104 is preferably a Peripheral Component Interconnect (PCI) bus, although other types of buses may be used. A GPIB control block 106 connects to the CPU bus 104 and interfaces the CPU 102 to one or more GPIB instruments, as desired. The GPIB control block 106 is preferably the TNT4882 chip produced by National Instruments Corp. A VXI control block 108 couples between the CPU bus 104 and one or more VXI instruments. A MXI interface 110 interfaces the CPU 102 to one or more MXI instruments and a serial interface 112 interfaces to one or more serial instruments. A data acquisition card 114 receives data from a device or unit under test (UUT) and provides this data to the CPU 102. An expansion bus bridge 120 is coupled between the CPU bus 104 and an expansion bus 121. The expansion bus 121 may be any of a number of types, including an AT or ISA (Industry Standard Architecture) bus, MCA (MicroChannel Architecture) bus, EISA (Extended Industry Standard Architecture) bus, NuBus, etc. One or more of a VXI interface 122, GPIB interface 124, and DAQ interface 126 are preferably coupled to the expansion bus 121, as shown.

Software Architecture (prior art)

Figure 4:
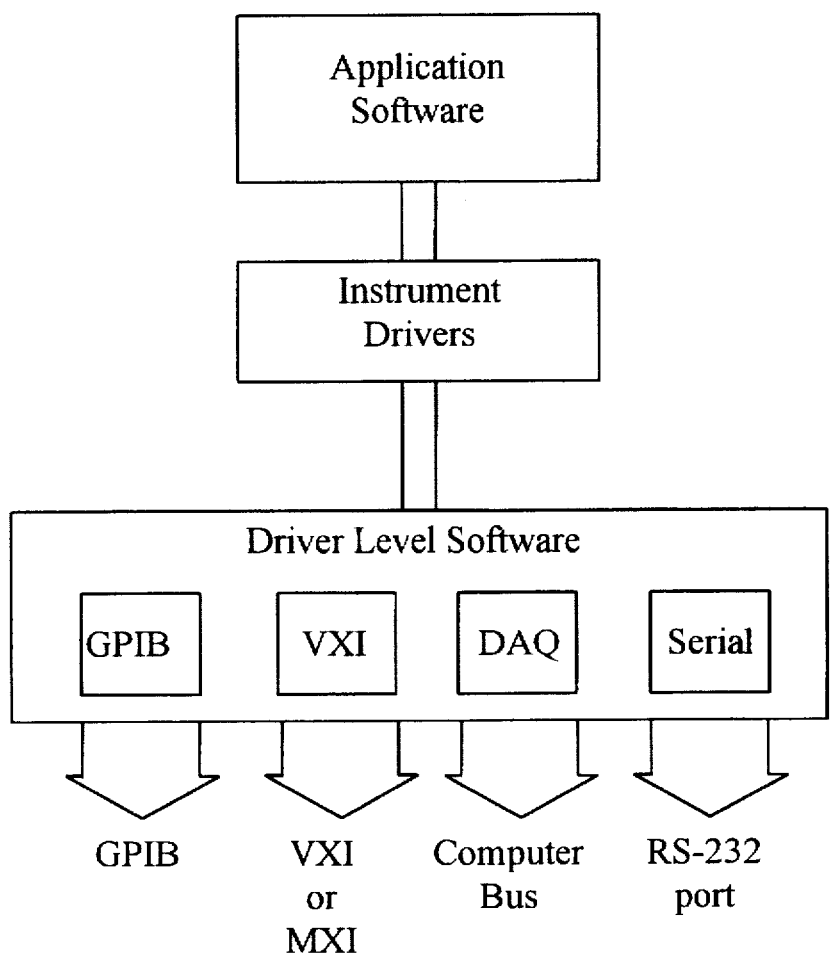
FIG. 4 illustrates the current software architecture for instrumentation systems.

Referring now to FIG. 4, a diagram illustrating a representative software architecture for an instrumentation system is shown. As discussed in the background section, the top level of the software architecture typically comprises an applications program used for high level control of the virtual instrument. The applications programs typically operate in conjunction with one or more instrument drivers to interface to actual physical instruments. The instrument drivers are designed to reduce a user's application development time by providing intuitive high level functions that relieve the user of complex low level instrument programming.

A software level referred to as driver level software or I/O control software is below the instrument driver level. Driver level software is used to interface the commands in the instrument driver to the actual hardware interface being used, such as a GPIB interface card, a data acquisition card, or a VXI card. In other words, driver level software handles the details of communication, i.e., the transfer of commands and data, over a physical connection between the computer and instruments.

VISA System Architecture

Figure 5:
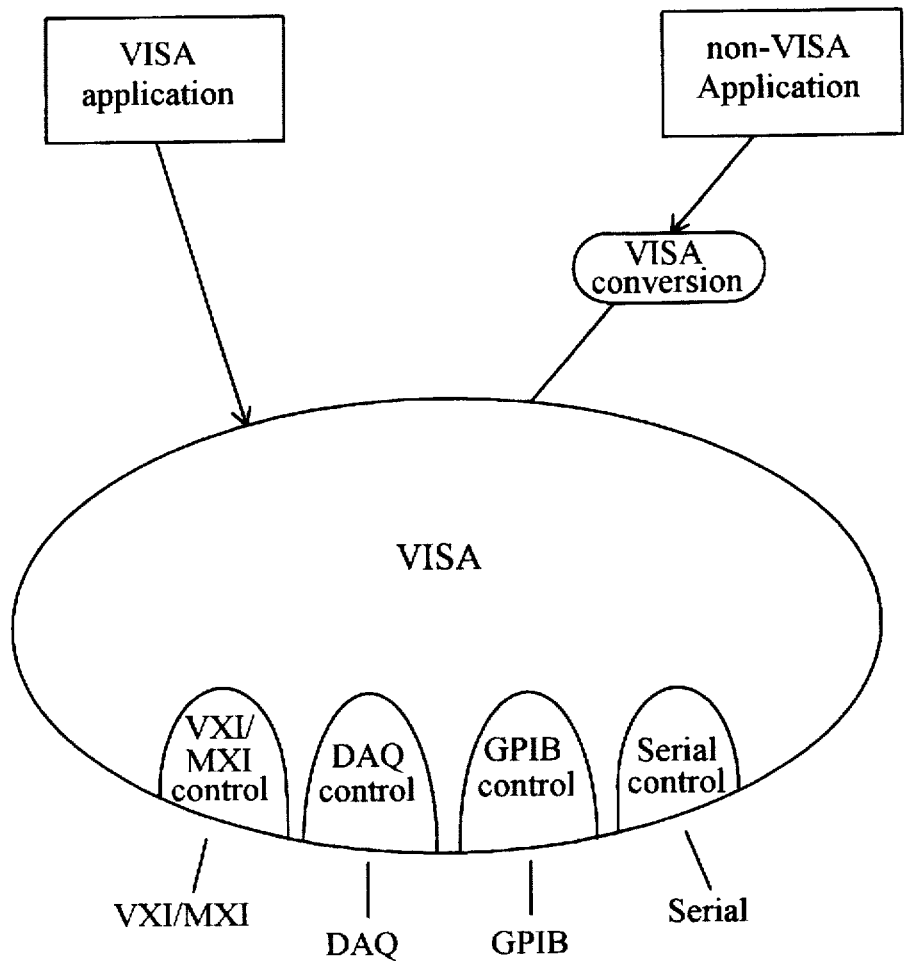
FIG. 5 illustrates the VISA software architecture of the present invention.

The present invention comprises a system and method for constructing resources in an instrumentation system, including instrument driver resources and higher level instrumentation applications. In the present disclosure, the present invention is based on a software architecture referred to as the Virtual Instrument Software Architecture (VISA), and a system developed according to the present invention can be referred to as a VISA system. Referring now to FIG. 5, a diagram illustrating the software architecture of the preferred embodiment of the present invention is shown. As shown, an application or resource created according to the method of the present invention, referred to as a VISA application, interfaces directly to a VISA system which in turn interfaces directly to hardware. FIG. 5 also illustrates the manner in which a non-VISA application, i.e., a software application which was not developed according to the system and method of the present invention, interfaces to a VISA system through a VISA conversion method or mapping library. A non-VISA application can comprise an application developed to conform to other driver level software standards, including NI-VXI, NI-488, and NI-DAQ from National Instruments Corp., or the Standard Instruments Control Library (SICL) from Hewlett-Packard, among others.

The Virtual Instrument Software Architecture (VISA) utilizes a device resource independence model which involves breaking a device down into its individual, non-overlapping (orthogonal) capabilities. VISA also uses object oriented concepts to simplify the creation of higher level applications. In VISA, the individual capabilities of devices are broken down into a plurality of objects called resources, and these resources are then used to develop instrument drivers or instrument control applications. The device resource independence model and its object oriented nature enable VISA to be independent of I/O interface type, operating system, and programming language. Thus VISA provides a single I/O interface or library which enables a user to control all types of instruments using any of the various types of I/O interfaces.

Due to its object oriented nature, VISA can operate transparently in distributed environments. In other words, the object oriented nature of VISA provides a direct mechanism for the distribution of I/O control software modules across any type of network. Also, the programming model of VISA is the same regardless of the location of a piece of VISA I/O control software and/or the location of the corresponding instrumentation hardware that the software controls. Further, the object oriented nature VISA allows a user to use the objects or resources provided to construct higher level resources, such as instrument drivers and/or applications software, as desired.

In a VISA system, a resource class generally is a definition of a particular capability of a device (such as read, write, trigger, etc.) or a combination of capabilities of a device (INSTR). A resource class is also the specific definition of how to create a resource, i.e., a template for the creation of resources. Each resource can have a set of characteristics called attributes associated with it. For example, an individual GPIB write port resource would have an attribute of End of Transfer Mode (send EOI with the last byte of the transfer) while a VXI interrupt resource would have an attribute of enabled/disabled for reception.

A resource is a particular implementation or instance of a resource class that controls a specific device functionality. Thus a resource is a particular implementation (or "instance" in object-oriented terms) of a resource class. More particularly, a resource is the particular instance of an instrument control resource class for a specific capability of a specific device in the system (e.g. a GPIB read port of a GPIB device at primary address 5). In a VISA system, a resource is defined as the smallest, logical, divisible capability of an instrumentation device controllable through its external connections. For example, a device might have a GPIB port that includes one or more read ports, write ports, status bytes, and so on, and/or the device could have a VXI port that provides control over individual TTL triggers, ECL triggers, VXI interrupt lines, as well as message-level communication. Each of these capabilities is a resource. A resource may also comprise a combination of two or more resources to represent functionality of a device such as an instrument.

Resources fall into one of two general types, these being a basic resource and a compound resource. A basic resource is a wholly contained software module that does not require other resources for operation. A compound resource is a software module that utilizes one or more basic and/or compound resources to provide a higher level of operation.

A resource comprises three elements: a set of attributes associated with the resource, a set of events that are asynchronously received by the resource, and a set of operations that control the resource. For example, a commander read port for a device might have attributes such as end of string character, timeout value, and protocol; one event might be a user abort; the only operation other than basic template operations would be a read operation (with parameters of a buffer and a number of bytes to transfer).

An attribute is a value within a resource which reflects a characteristic of the operational state of the resource. A user's application reads an attribute value to determine the current state of the resource, for example, how the resource is processing an operation, or how the resource should operate when something occurs. A user application sets an attribute to change the way in which the resource operates. For example, if a user's application desires to use a write resource and wants to use a direct memory access (DMA) method, the user's application would set the attribute transfer mode to DMA and then perform the write operation. In this manner, an attribute changes the characteristics in which a resource operates.

An event object is an asynchronous occurrence that can arrive independently of normal sequential execution of the process running in a system. Examples of events include, but are not limited to, items such as hardware interrupts, exceptions, triggers, signals, and system messages (i.e., a system failure notification). The events that can occur in a VISA system include events that are received by only a single resource and events that can affect more than one resource. In a VISA system, events allow information exchange.

An operation is an action defined by a response that can be performed on a resource, and operations are the primary method of communication among resources and between applications. After a session is established between an application and a resource, the application can communicate with the resource by invoking operations on the resource. Each resource describes the operations which it supports (which are described further below) and the resource and the application exchange information through the parameters of the operations.

A session object designates a communication channel between a user's application and a resource. In other words, a session object is a communication channel that binds an application and a resource. A session describes and implements the behavior of individual connections to resources.

In essence, a session object is an instance of a session class, much the same way a resource is an instance of a resource class. Resources can have multiple sessions open to them. In addition, a resource can control one or more other resources.

VISA System

Figure 6:
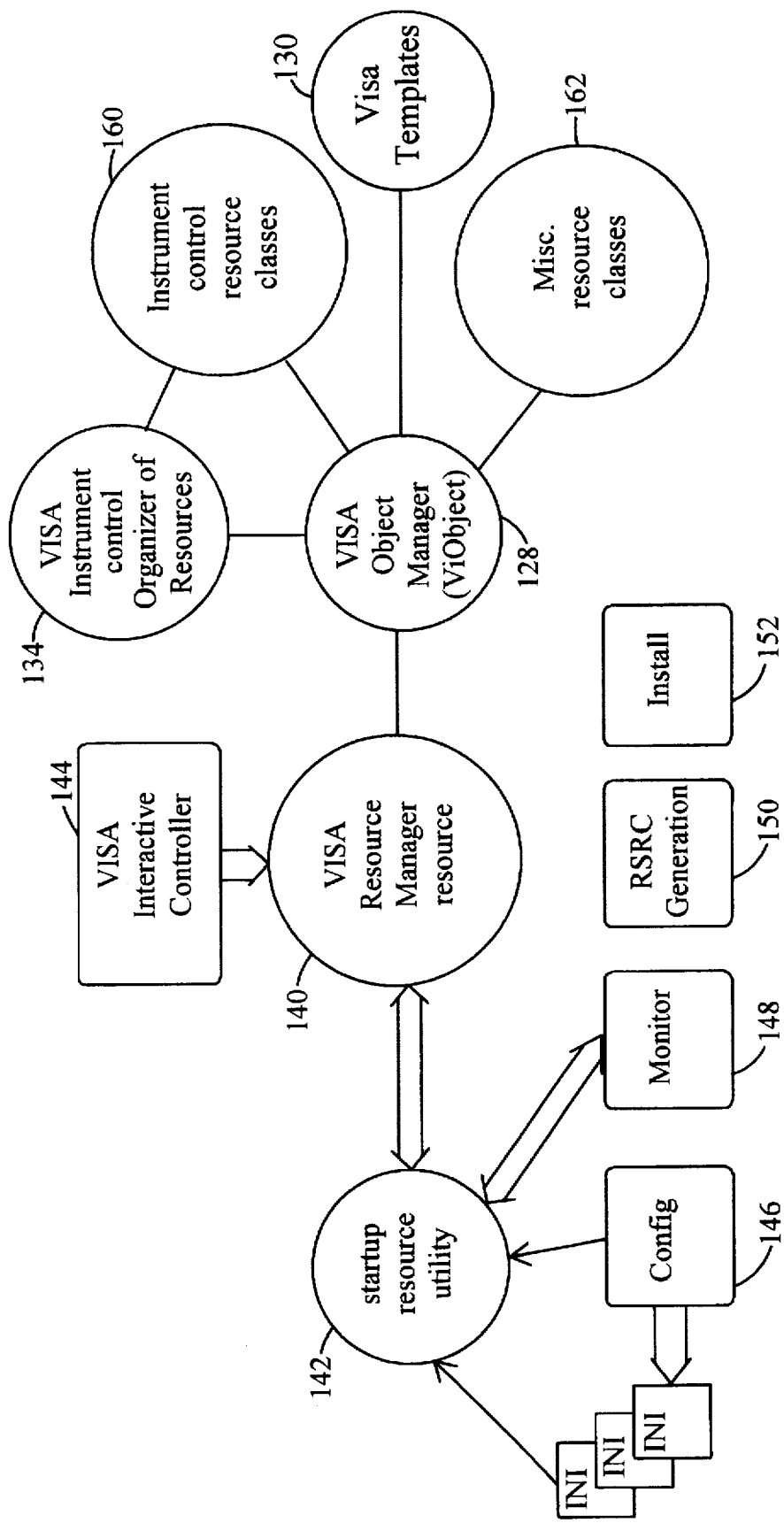
FIG. 6 illustrates the components of a VISA system according to the present invention.

Referring now to FIG. 6, the various elements comprising the preferred embodiment of the present invention are shown, including various utilities for installation and configuration. Each of these elements are preferably software elements stored in the memory 103 of the computer system. As shown, a VISA system includes a VISA Object Manager 128, VISA Templates 130, a VISA Resource Manager 140, which acts as the primary or runtime resource manager, a startup resource utility 142, a VISA interactive controller 144, a configuration utility 146, a monitor utility 148, a resource generation utility 150, and an install utility 152. In addition, an instrumentation system according to the present invention includes a plurality of instrument control resource classes 160 as well as other resource classes 162, as desired, which preferably incorporate their interface from one or more of the VISA Templates 130. The present invention may further include a VISA Instrument Control Organizer (VICO) resource 134 that incorporates its interface from one or more of the VISA Templates 130 and can be used to control the instrument control resource classes 160.

The instrument control resources 160 and other resources 162 act as building blocks for user applications. In the present disclosure the term "user" is intended to include a client which uses the available resources to create client applications as well as a developer who either uses or incorporates the available resources to develop new, possibly higher level, resources. It is noted that the present invention can include one or more additional runtime resource managers as well as additional groupings of resource classes for additional functionality, as desired.

Instrument Control Resource Classes

The instrument control resource classes comprise resource classes for controlling GPIB, VXI, and serial instruments as well as data acquisition boards. The instrument control resource classes can be logically partitioned into common resource classes and device-specific resource classes. Common resource classes are those class definitions that have some commonality with one or more types of devices (e.g. both GPIB and VXI or both VXI and a trigger board) or that can be defined in a manner such that the resource class is independent of the device with which it is communicating (e.g. formatted I/O). Device-specific or interface-specific resource classes (also called hardware-specific classes) are those resource classes that have no commonality with other types of resource classes and are used to control device and/or interface level features specifically for a single type of device Device-specific resources class are required where the capabilities of the bus or connection to the device cannot be separated from the undivided device. An example is the Interface clear line on the GPIB bus, which is a line that is bussed across the entire GPIB bus and thus affects other devices. The resource classes 162 may comprise classes for process control, among others.

VISA Object Manager

The VISA Object Manager 128 provides capabilities to control and manage objects, wherein an object is an instance of a class. The VISA Object Manager 128 includes important capabilities such as registration of interface definitions, creation and destruction of objects, characteristic control, and operation invocation. Thus, the VISA Object Manager 128 includes a service used to register interface descriptions for classes of objects, and thus maintains an interface repository. The VISA Object Manager also provides life cycle services used by a client application to create and destroy objects. The life cycle services are also used to free up associated system resources when a client uninitializes an environment. The characteristic control services are provided by an object to get or set values of an attribute if that attribute is exported by an object. The operation invocation services are used to allow objects to communicate with one another by invoking operations. Operations can be invoked on other objects within a given computer system across a distributed system or network. The operation invocation service also provides mechanisms to report the completion status of operations. A VISA system preferably uses a CORBA 2 (Common Object Request Broker Architecture) object broker, such as the System Object Model (SOM) object management environment. Alternatively, a VISA system uses an OLE/COM object request broker.

The VISA Object Manager comprises an object management environment and also includes a basic class definition referred to as the ViObject class. The ViObject class is the most basic object in a VISA system and all other classes in VISA inherit functionality from the ViObject class and are derived either directly or indirectly from the ViObject class. The ViObject class contains operations for object destruction and characteristic control. An object is created using a function referred to as viOpenObject. For more information on the VISA Object Manager refer to Appendix 1, which is incorporated herein by reference as though fully set forth herein.

The ViObject class supports attributes, i.e., viGetAttribute and viSetAttribute and closing, i.e., viClose and terminating objects, i.e., viTerminate.

VISA Templates

The present invention includes a plurality of VISA Templates which include ViResource, ViSession, ViEvent, and ViEvent Filter classes. The VISA Templates inherit from ViObject and define an interface including a well-defined set of services that are used by all resources. Each VISA resource derives its interface from the VISA Template set that provides standard services for the resource. This increases the ability to revise, test and maintain the resource.

The VISA templates define a set of control services including session termination control (extended life cycle control), local/global attribute management services (extended characteristic control), allowing or disallowing access to a particular resource (access control), and basic communications services, including operation invocation and event reporting. As noted above, a VISA system according to the present invention defines an architecture comprising a plurality of resources which encapsulate device functionality. Each resource provides specialized services to applications or to other resources. The VISA system of the present invention maintains a high level of consistency and extensibility in the operation of VISA resources. This consistency and extensibility are achieved through the VISA templates.

As noted above, the VISA Templates also define various communications services among resources and between applications and resources. The two methods of communication among resources and between applications are operation invocation, i.e., invoking operations on a resource, and the exchange of information through events. After establishing a session to a resource, an application can communicate with the resource by invoking operations on the resource. These operations include the operations defined in the respective VISA Templates as well as the operations supported by the particular resource. The resource and application exchange information through the parameters of the operations. The VISA Templates also define event reporting, including callbacks, queuing, and waiting services for resources during system events, exceptions, and resource defined events.

The ViSession class provides most of the implementation of the template interface available to the user, including the communication services (operation invocation), the characteristic control services (attributes), and life cycle services (creating and destroying objects) as derived from ViObject. In addition, the ViSession class introduces the access control services (locking), and extends the communication services provided by ViObject by introducing event-based communication.

The ViResource class also derives from the ViObject services and adds life cycle control of sessions. Through the life cycle service of ViResource, users can create new sessions using the viOpenSession( ) operation. It is noted that this session operation is not available to user applications, although user applications can open sessions indirectly through the resource manager. In addition to providing life cycle control of sessions, the ViResource class also acts as a global storage across all the sessions.

Thus, whereas the services provided by session objects affect only the individual sessions, the ViResource object provides services that can affect multiple sessions or are global to all the sessions of a resource.

VISA Resource Manager

The VISA Resource Manager derives its interface from the ViSession and ViResource classes and one or more of the VISA Templates. The VISA Resource Manager is responsible for managing, controlling, and distributing resources within the system, including the instrument control resources. The VISA Resource Manager shields resource implementations from having to know about most details of resource management and distribution of instrument control resources within a system.

Applications use the VISA Resource Manager to create sessions with particular resources within a system. The VISA Resource Manager presents a common interface to all instrument control resources in the system regardless of their physical location. The VISA Resource Manager includes the following responsibilities: registration of resources (from the system point of view), un-registration of resources, locating resources (location search), management of session creation, modification and retrieval of resource attributes, operation invocation, event reporting, and access control, among others. The VISA Resource Manager includes an API for these management needs, and all defined resources may use these capabilities. The VISA Resource Manager allows a user to open a session to any resource in the system, including only single device capabilities such as a single trigger line or a single write port on a device.

At startup of the system, a method is invoked which configures the instrumentation system. This method involves determining the respective hardware and instruments available within the system as well as determining the logical address of the respective instruments in this system. The method determines the classes available within the system and uses the determined classes and the hardware configuration to create or instantiate resources. These newly created resources are then registered with the VISA Resource Manager so that the VISA Resource Manager is aware of their presence. The registration process comprises providing entry points of the resource to the VISA Resource Manager, including a description of the operation, a description of the attributes, a description of the exit conditions, the location of the files, and a description of the files themselves. Due to the hierarchical nature in which some resources use other resources for their operation, the instantiation and registration process may require the creation and instantiation of other resources.

Once a plurality of resources have been created and registered with the VISA Resource Manager, these resources can be used to create instrument control applications. In the present disclosure, the user of a VISA system can either be a client or developer. A client uses the resources in a VISA system to create applications, such as instruments drivers, that are not themselves resources. A developer, on the other hand, uses resources as a client or incorporates functionality from the resources available in a VISA system to create higher level applications that are resources. A developer can create a higher level resource that uses other resources, much the same way that a client uses resources, or the developer can create a higher level resource that incorporates functionality from one or more resources. As an example of a higher level resource, a developer can develop a resource that embodies all of the functionality of a type of instrument, such as a voltmeter. This resource can then be used to control any type of voltmeter using any type of I/O interface.

When VISA is implemented in the C++ programming language, a resource class and a session class are preferably implemented as C++ classes. A resource instance or resource and a session instance or session are implemented in C++ as instances of the class. A resource preferably includes references to global data that are global to the session. A session instance maintains a reference to local data that is local to the session.

As discussed above, a session object designates a communication channel between a user's application and a resource. A function call or operation on the VISA Resource Manager 140 referred to as ViOpen instructs the VISA Resource Manager 140 to create a session between a resource and a user's application, which may also be a resource. In many instances it is desirable for more than one application to be able to control an instrument. In these instances it is necessary to have more than one communication channel to the respective resource that controls the respective capability of the instrument. The session is the mechanism used to project the interface for a resource out to the user application. Thus, a session is a communication channel that binds an application and a resource. In essence, a session is an instance of a resource, much the same way a resource is an instance of a resource class. Resources can have multiple sessions open to them. In addition, a resource can control one or more other resources. The VISA Resource Manager 140 allows a user to open a session to any resource in the system, including single device capabilities such as a single trigger line or a single write port on a device.

VICO

In one embodiment of the invention, a VISA system includes a resource referred to as the VISA Instrument Control Organizer (VICO) 134 which allows for the creation of user-defined resource groupings (virtual instruments). A virtual instrument, in this context, refers to a unique session to a resource to provide the functionality of a traditional, stand-alone instrument. The VICO 134 is included in this embodiment to provide a higher level user interface so that users can communicate with instrumentation at a higher level of abstraction. The VICO 134 is a resource similar to other resources in the system. VICO 134 is unique, however, in the sense that it serves only one unique service specifically for instrument control resources. With VICO 134, applications can create sessions that can communicate with any number and type of Instrument control resources. In other words, a single VICO session can control all aspects of one or more complete devices. Thus VICO 134 encapsulates features of the resources for users who require a simple interface.

Utilities

The startup resource utility 142 registers and unregisters resources with the VISA Resource Manager 140 at startup, monitors VISA Resource Manager events, and provides the capability to monitor resources and events. The resource monitor utility 148 monitors the resources that are registered to the VISA Resource Manager 140 and also monitors active instantiations of resources to the VISA Resource Manager 140. The resource monitor 148 also monitors for specific events occurring in the VISA Resource Manager 140, and maintains a log or history of user specified VISA actions. The configuration utility 146 operates to modify default attributes for resources as directed by a user, as well as modify information needed by the resource to find the hardware. The configuration utility 146 also notifies the resource manager of new resources in the system, creates aliases for groupings of resources, and informs the resource manager of these aliases.

The VISA interactive control utility 144 interactively and dynamically finds resources and executes methods of those resources. The VISA interactive control utility 144 also simulates VISA actions/events. It is noted that the capabilities of this utility are derived from the VISA application programming interface. The resource generation utility generates a resource usable by the configuration utility and the resource manager utility from a user defined set of entry points and structures. All of the above utilities preferably interact to provide a high level of integration between the individual components. It should be noted also that most of the description of the individual resources is provide through the interface description language specification, from which each resource is clearly and uniquely described. This information, along with the registration information provided to the resource manager, forms the basis for the configurability and interactivity of the system. The Install utility 152 provides a common look and feel to installation of components within the VISA system.

Example VISA System

Figure 7:
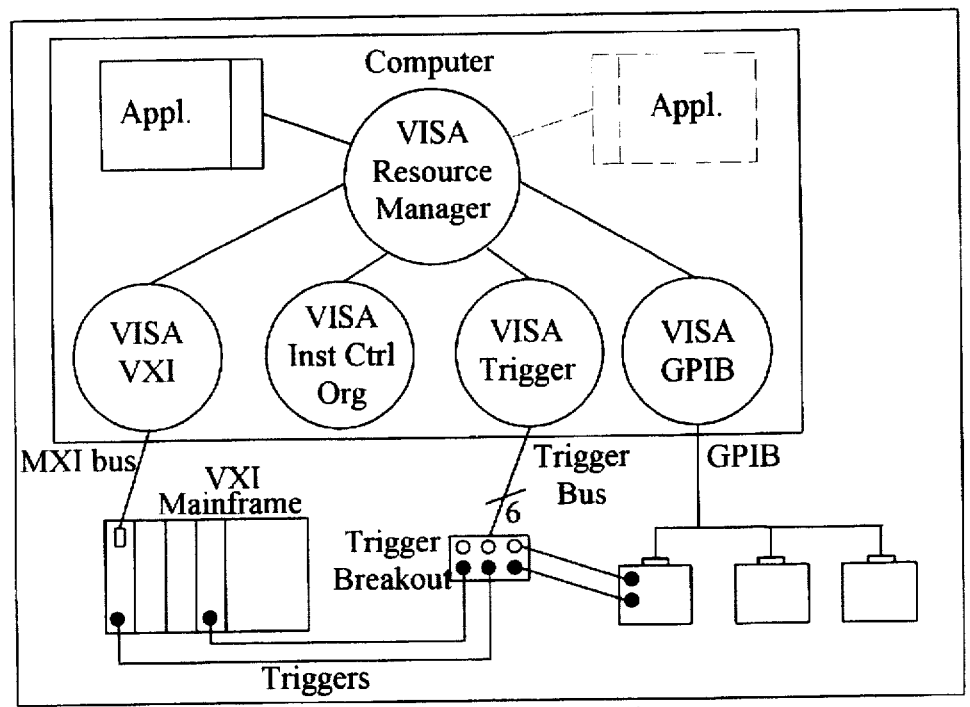
FIGS. 7 and 8 illustrate two examples of a VISA instrumentation system in a non-distributed and distributed environment, respectively.
Figure 8:
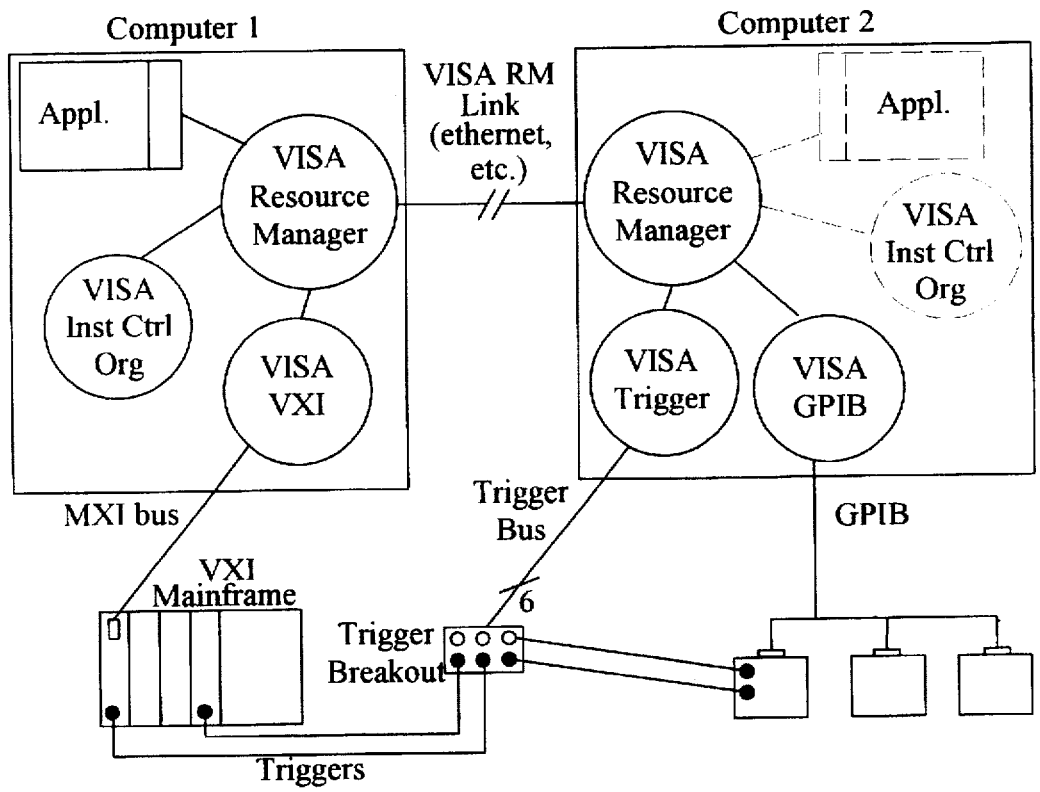

Referring now to FIGS. 7 and 8, block diagrams illustrating various embodiments of a VISA system of the present invention are disclosed. FIG. 7 shows a VISA system where one or more applications control various resources, such as a VXI resource, a trigger resource, and a GPIB resource through the VISA Resource Manager 140. The applications also use the VICO 134 to aid in the creation and use of these resources. As shown, the VXI resource controls the VXI mainframe through a MXI bus. The trigger resource controls a trigger breakout device through a trigger bus and the GPIB resource controls one or more GPIB instruments through the GPIB bus.

FIG. 8 illustrates an embodiment of a VISA system according to the present invention in a distributed environment. As discussed further below, the device resource independent and object oriented nature of the present invention allows for the method of the present invention to be readily adapted to distributed environments. FIG. 8 illustrates an embodiment where two or more computers in different physical locations are used to control a single instrumentation system. As shown, computer 1 includes an application which controls one or more resources. As shown, the application controls a VXI resource and VICO 134 through the VISA Resource Manager 140. Computer 2 includes an application that also controls one or more resources through a second VISA Resource Manager 140, in this example, a trigger resource and a GPIB resource, as well as VICO 134. Computer 1 communicates with computer 2 through a VISA Resource Manager link such as a network connection such as Ethernet. As shown in Computer 2, the dashed lines around VICO 134 and the application indicate that the application and VICO 134 are not necessary in computer 2, and the application in conjunction with the VISA Resource Manager 140 in computer 1 can control all of the resources and the VISA Resource Manager 140 in computer 2, as desired.

Resource Classes

Figure 9:
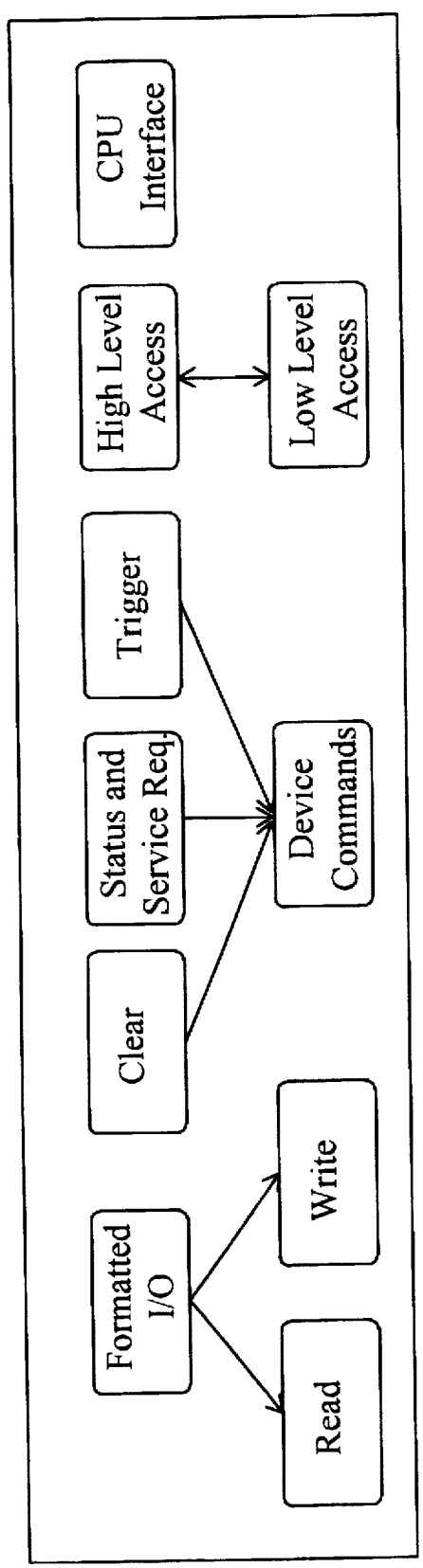
FIG. 9 illustrates the common instrument control resource classes according to one embodiment of the invention.
Figure 10:
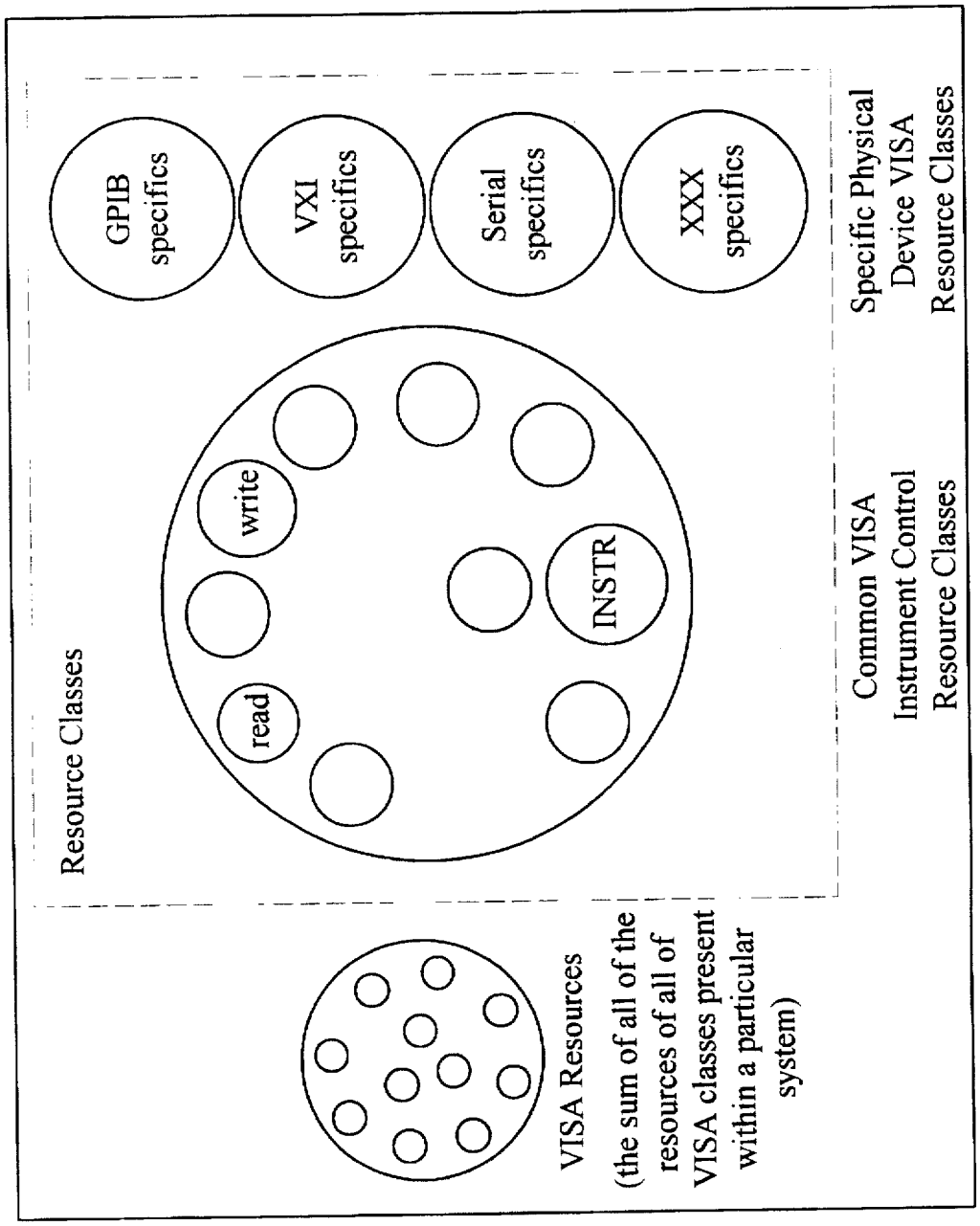
FIG. 10 illustrates the common instrument control resource classes and specific physical device VISA resource classes and corresponding VISA resources.
Figure 12:
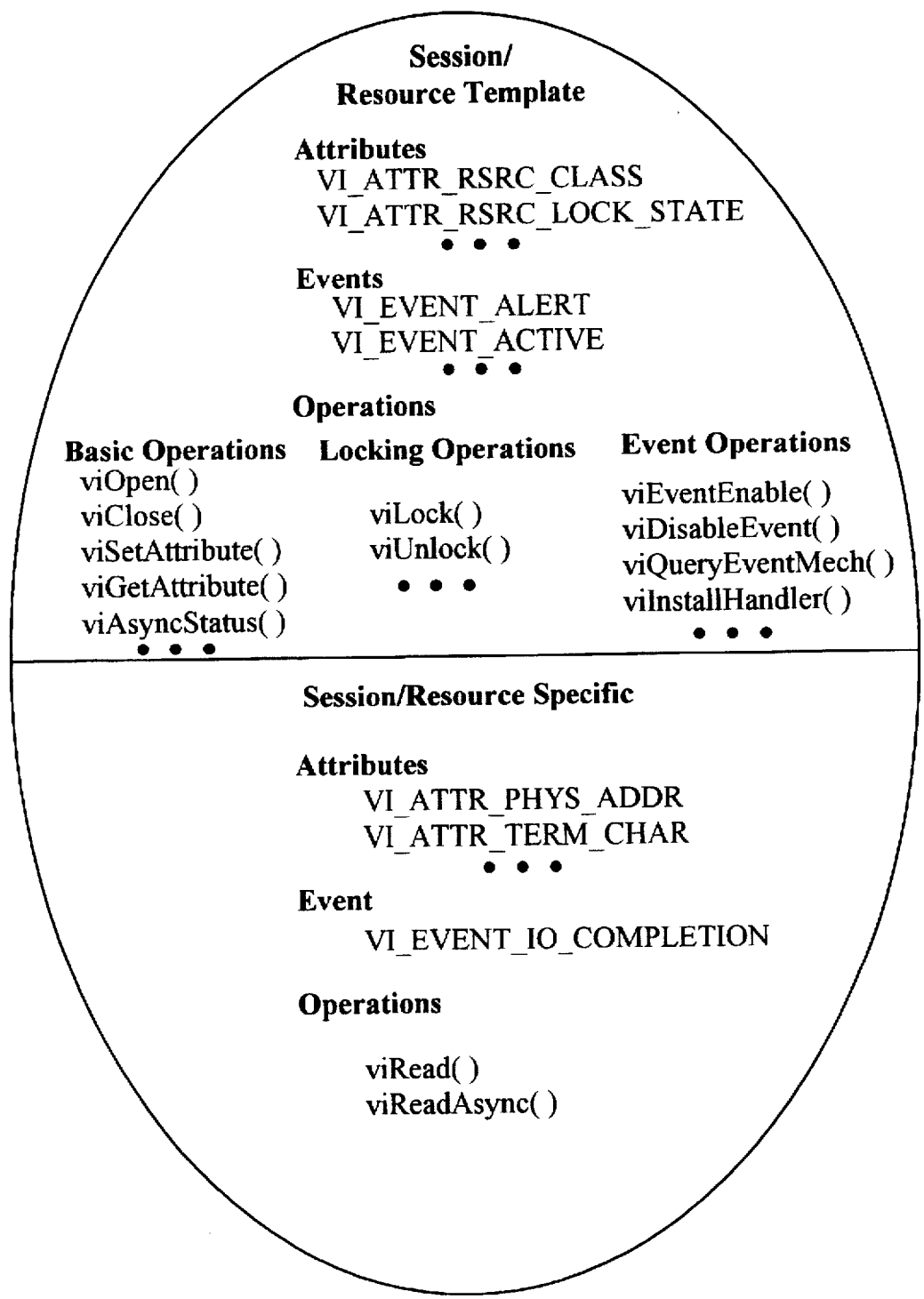
FIG. 12 illustrates the organization of an instrument control resource class.

FIGS. 9 and 10 illustrate the resource classes comprised in the instrument resource classes block 160. The instrument control resource classes 160 are provided to encapsulate the various operations of a device, including read, write, trigger, and so on. A VISA instrument control resource, is defined by the basic operations, attributes, and events of the ViObject class and one or more of the VISA Templates. The instrument control resource classes 160 provide certain operations included in one or more of the VISA Templates 130. As shown in FIG. 12, from the basic interface of one or more of the VISA Templates, i.e., this basic set of attributes, events, and operations, each resource class adds its specific operations, attributes and events, which allow the class to act as a template for resources which perform the dedicated task of the class, such as sending a string to a message-based device.

FIG. 9 illustrates the common resource classes in one embodiment, these being: Formatted I/O, Read, Write, Clear, Status and Service Request, Trigger, Device Commands, High Level Access, Low Level Access, and CPU Interface. FIG. 9 also shows the hierarchy or relationship of the common instrument control classes. As shown, the Formatted I/O resource class relies on the Read and Write resource classes for its operation. Thus, when a resource from the Formatted I/O resource class is instantiated, the resource opens sessions to the appropriate Read and Write resources. Likewise, the Clear, Status and Service Request, and Trigger resource classes rely on the Device Commands resource class for their operation. The High Level Access resource class relies on the Low Level Access resource class for its operation. Some resources, such as the CPU Interface resource, have no inter-relation with any other instrument control resource. This does not imply that the resource cannot be used with the other resources, but that it does not use, and is not used by, any other instrument control resource.

FIG. 10 illustrates an example resource class comprised in a VISA system. A VISA resource can implement its functionality directly, such as reading data off the bus, or can create sessions to other resources, which may include calling the parent class to implement the desired functionality. FIG. 10 also shows that the sum of all the VISA instrument control resource classes is comprised of the common instrument control resource classes and the specific device (interface or hardware specific) instrument control resource classes. As shown, the specific physical device resource classes include GPIB specific, VXI specific, and serial specific resource classes.

Figure 11:
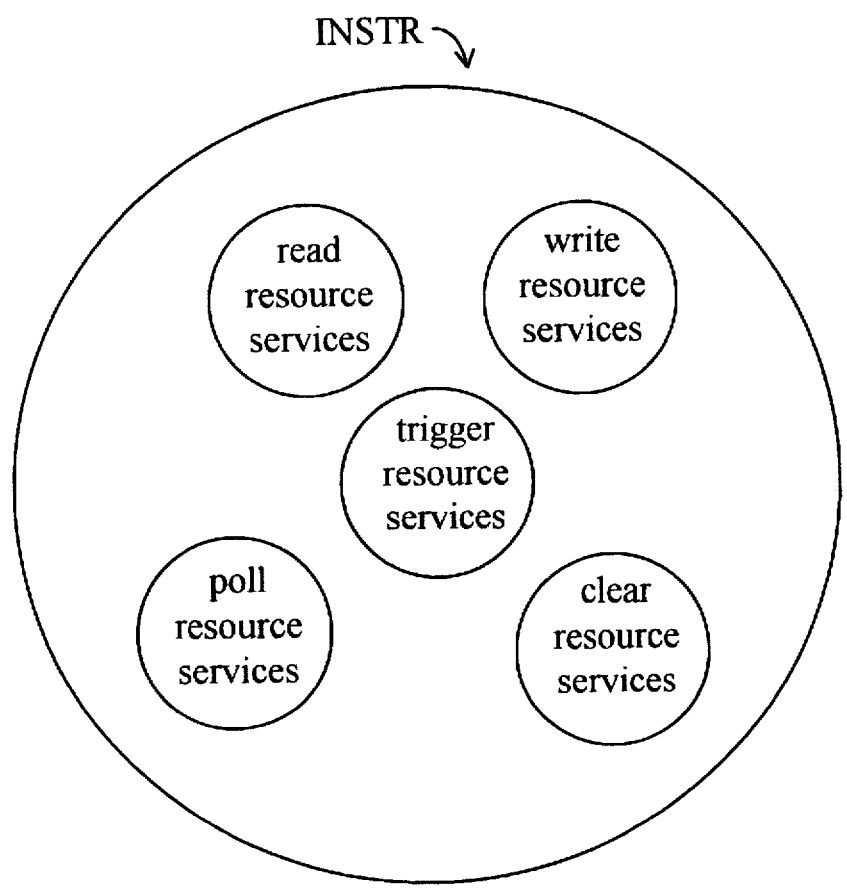
FIG. 11 illustrates an INSTR resource according to the preferred embodiment of the invention.

Referring now to FIG. 11, in the preferred embodiment a VISA system includes a resource class referred to as INSTR. The INSTR resource is an abstraction which includes different resources for different types of instruments. For example, an INSTR resource for a register-based device preferably only includes High Level and Low Level accesses, while an INSTR resource for a GPIB device preferably only includes read, write, trigger, poll and clear resources. An INSTR resource for a message-based VXI device preferably includes read, write, trigger, poll and clear resources in addition to High Level and Low Level resources. FIG. 11 illustrates an INSTR resource which includes read, write, trigger, poll and clear resource services.

Figure 11A:
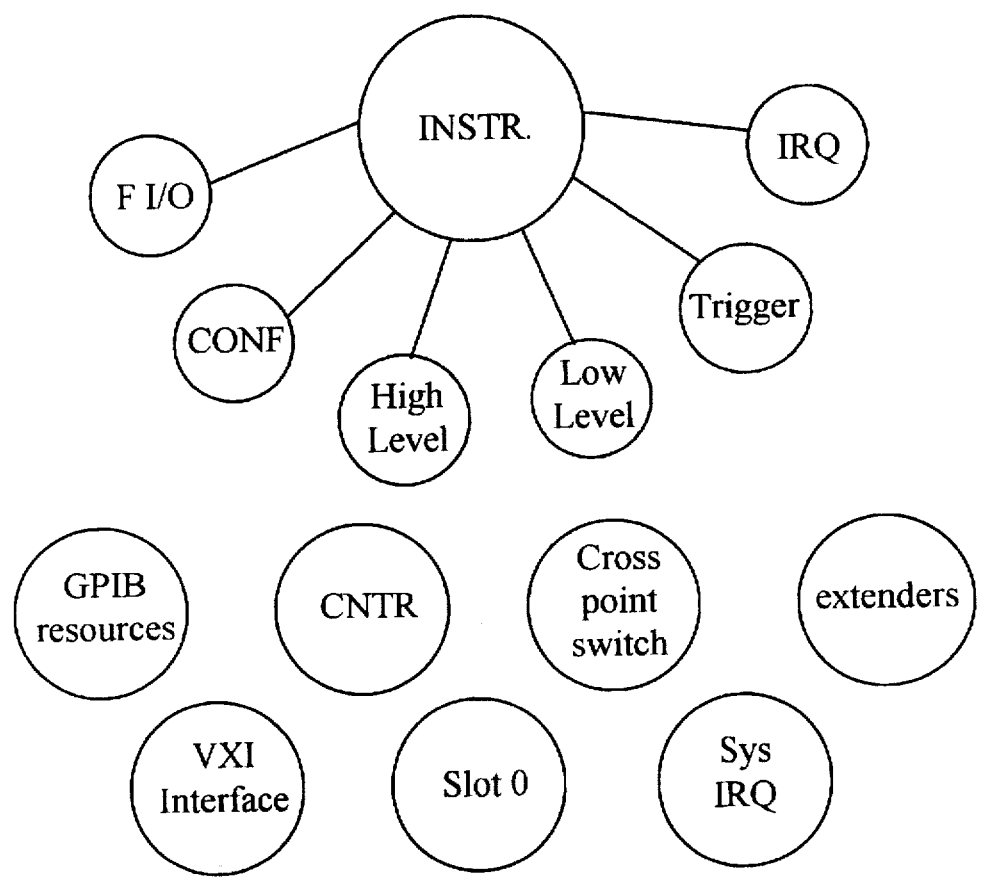
FIGS. 11A–11C illustrate the relationship of the INSTR resource to other resources in the system.

FIG. 11A illustrates that the INSTR resource may use one or more of the Formatted I/O, Configuration, High Level, Low Level, Trigger, and IRQ resources. FIG. 11A also illustrates various "stand-alone" resources, including GPIB resources, a Counter (CNTR) resource, a Cross-Point Switch (CPS) resource, an extenders resources, a VXI Interface resource, a Slot 0 resource, and a System IRQ resource.

Figure 11B:
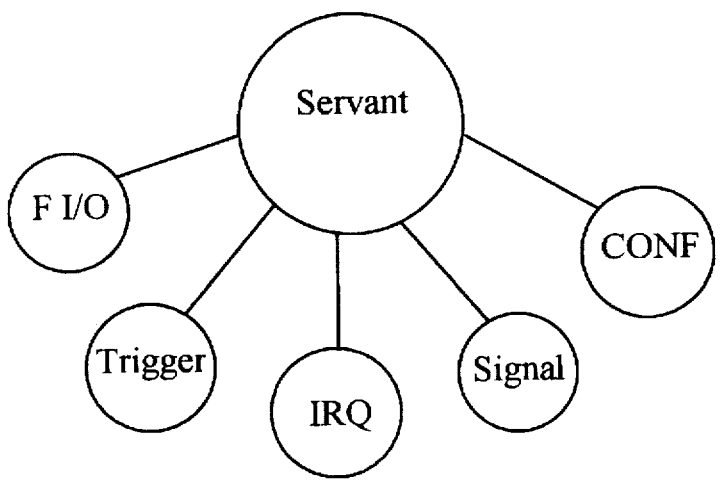

FIG. 11B illustrates a Servant resource which is used by the INSTR resource. As shown, the Servant resource may inherit or derive from the Formatted I/O resource, the Trigger resource, the IRQ resource, the Signal resource, and the Configuration resource.

Figure 11C:
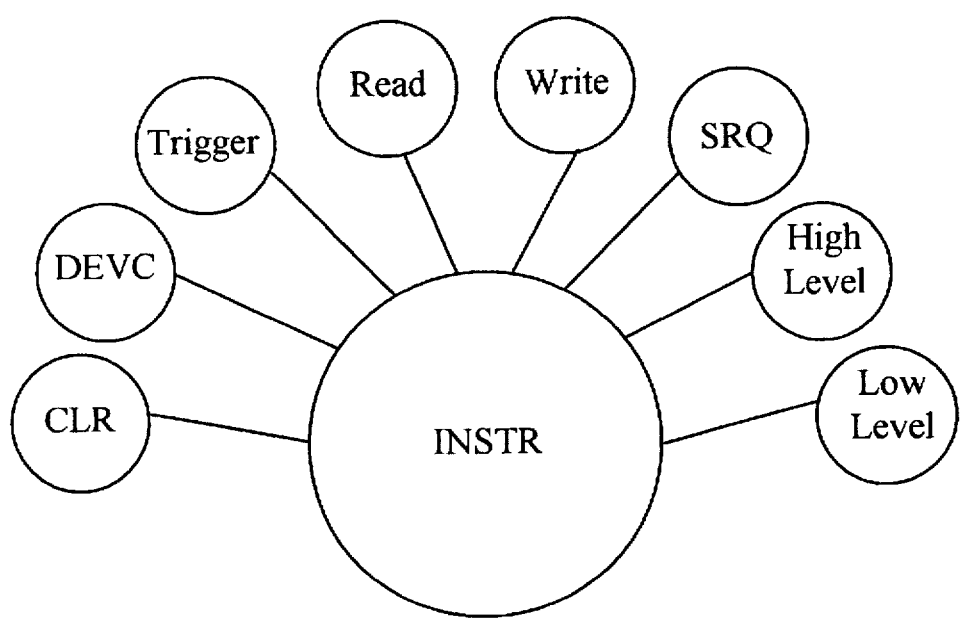

FIG. 11C illustrates the manner in which the INSTR resource may present an interface of other resources, including the read resource, write resource, clear resource, Device Clear (DevC) resource, Trigger resource, service request (SRQ) resource, High Level resource, and Low Level resource. As shown, the Formatted I/O resource interface appears through the read or write resources, which in turn are extensions of the INSTR resource.

The instrument control resource classes according to one embodiment are discussed in detail in Appendix 1 of U.S. patent application Ser. No. 08/238,480, previously referenced and incorporated by reference herein in its entirety. As shown in Appendix 1 of the patent application referenced above, each of the instrument control resource classes include a number of attributes, operations, and events for implementing respective capabilities of instruments. The instrument control resource classes in a VISA system according to the preferred embodiment are listed in Appendix 1 to the present application.

Referring now to FIG. 12, a diagram illustrating the organization of one of the instrument control resources 160 is shown. As previously noted, each of the instrument control resources 160, derive functionality from one or more of the VISA Resource Templates. FIG. 12 illustrates the manner in which each instrument control resource 160 includes a portion (upper portion) that derives its interface from one of the one or more VISA Resource Templates, and a portion (lower portion) that comprises an interface that is specific to that particular resource.

Figure 13:
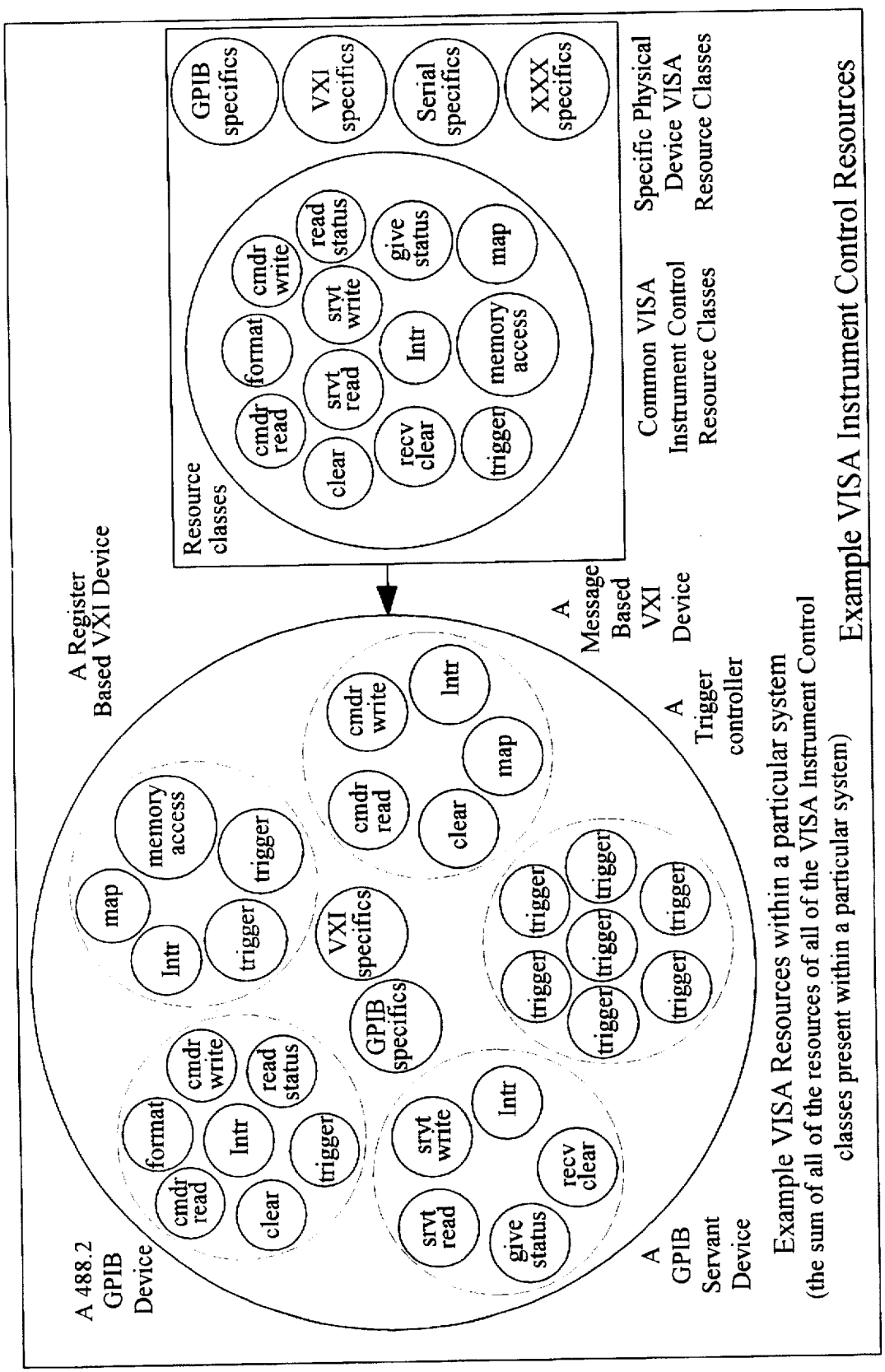
FIG. 13 illustrates example VISA instrument control resources.

FIG. 13 shows an example of the resources that might be created when a system has been powered up and in use. The resources in this example are based loosely on the example configuration shown in FIGS. 7 and 8. In this example, resources are created for the VXI system, the GPIB system, and the trigger controller. It is noted that only the device capabilities that each device has are reflected in the set of resources in the system. It is also noted that the medium size circles are provided around groupings of resources simply as a visual grouping organization, and these circles are not intended to connote any meaning regarding system operation or usage of resources. From the standpoint of the VISA Resource Manager, each resource in the system is treated exactly the same.

VISA System Operation

Figure 14:
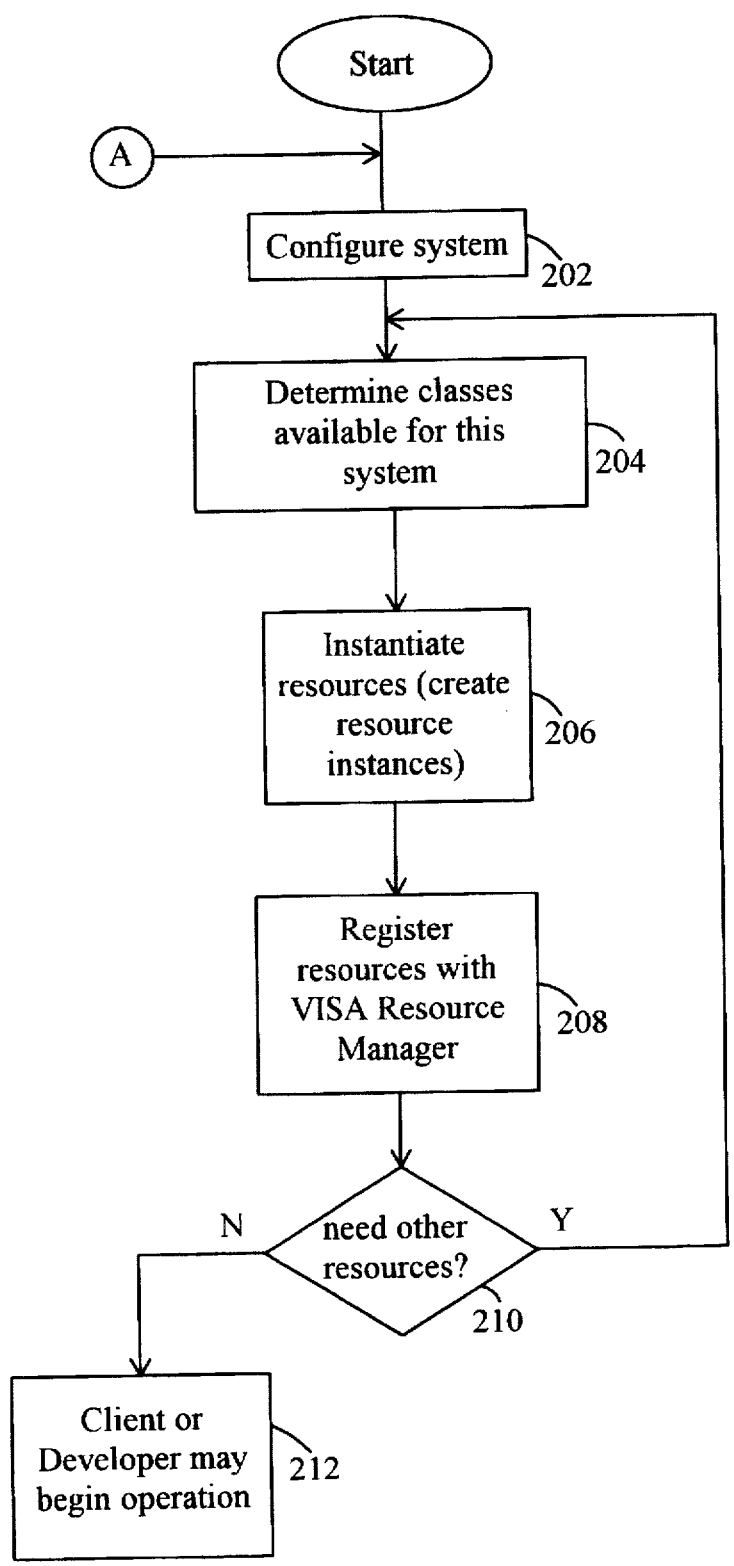
FIG. 14 is a flowchart diagram illustrating the configuration steps performed by a VISA system.
Figures 15, 16:
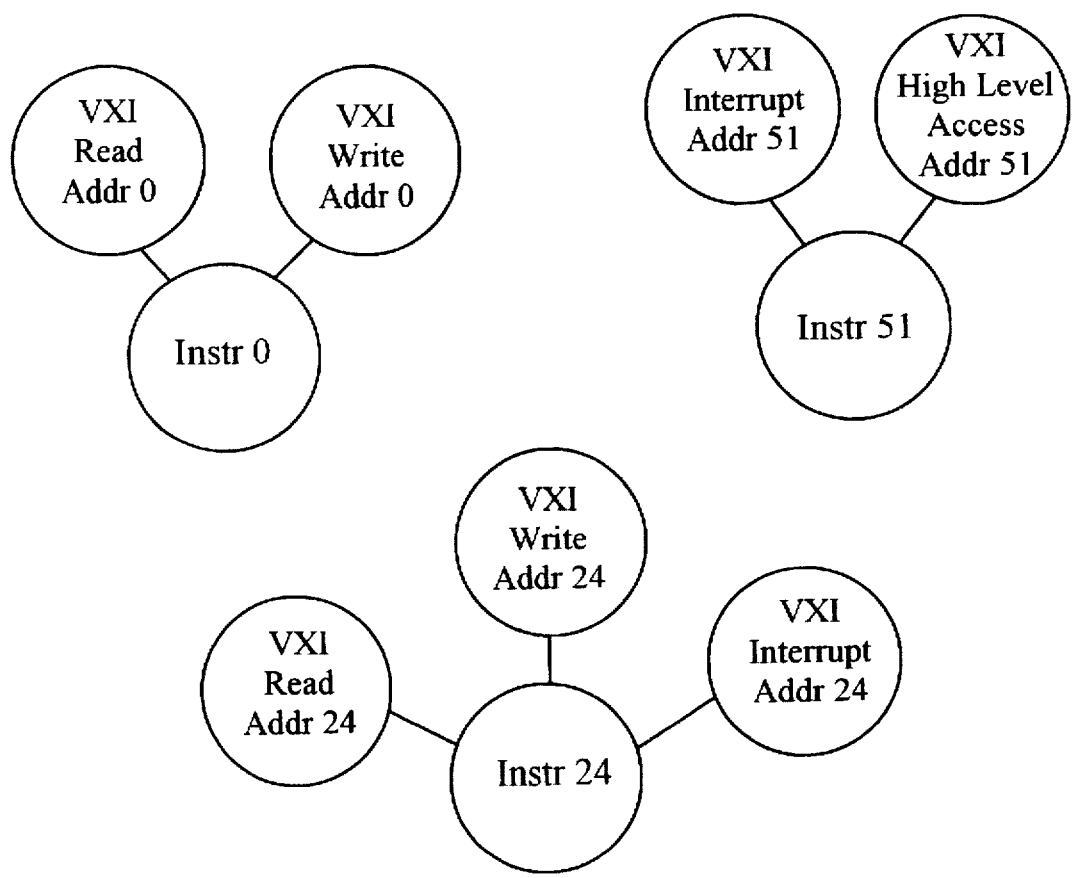
FIG. 15 illustrates an example of instrument devices and resource classes implemented in an example VISA system.
FIG. 16 illustrates the resources created by the configuration method of FIG. 14 for the example VISA system of FIG. 15.

Referring now to FIG. 14, a diagram illustrating operation of the present invention at power up is shown. This operation is described in conjunction with a simple instrumentation system which is shown in FIGS. 15 and 16. As shown in FIG. 15, the example instrumentation system includes a VXI chassis including a CPU card, a message based device card and a register based device card. The CPU card has an address of 0, the message based device has an address of 24, and the register based device has an address of 51. The resource classes available in this example are Read, Write, High Level Access, and VXIbus Interrupt.

Referring again to FIG. 14, in step 202 a method is invoked which configures the instrumentation system. This method involves determining the respective hardware and instruments available within the system as well as determining the logical address of the respective instruments in this system. In the present example, in step 202 the method would determine that there is a VXI CPU card having address 0, a respective message based device having an address of 24, and a respective VXI register based device having an address of 51 comprised within the system. In step 204 the method determines the classes available within the system. In the present example, the method would determine that the classes available are Read, Write, High Level Access, and Interrupt. In step 206 the method uses the classes determined in step 204 and the hardware configuration determined in step 202 to create resources.

Referring now to FIG. 16, a diagram illustrating the resources that are generated in this example are shown. As shown, the resources created include INSTR resources for each of the devices, i.e., each of the addresses. As shown, the INSTR resource for address 0 presents a VXI Read of address 0 and a VXI Write of address 0. The INSTR resource for address 24 presents a VXI Read of address 24, a VXI Write of address 24, and a VXI Interrupt at address 24. The INSTR resource for address 51 presents a VXI Interrupt at address 51 and a High Level Access at address 51. Each of these are views of individual INSTR resources to each physical device.

The startup resource utility 142 instantiates or creates these resources in step 206. The step of instantiating or creating resources in step 206 involves creating an instance which includes code that is inherited or incorporated from the class determined in step 204. The example shown in FIG. 15 includes a read resource class. In order to create an instance of that class, for example a VXI read instance, the method creates an instance which inherits from the interface of the read class. The method may also overwrite a portion of this inherited code with new code that actually implements the specific reads for the interface, in this example the VXI interface.

In step 208 the startup resource manager registers these resources with the VISA Resource Manager 140. In other words, the application programming interface of the resource is provided to the VISA Resource Manager 140, and the resource is provided with a unique name or identifier. The registration process comprises providing entry points regarding the resource, including a description of the operations, a description of the attributes, a description of the exit conditions, the location of the files, and a description of the files themselves.

Upon completion of step 208, the method determines in step 210 if other resources are needed to register the resources in step 208 that were created in step 206. Due to the hierarchical nature in which some resources require other resources for operation as discussed above with regard to FIG. 22, it may be necessary for other resources to be created and registered with the VISA Resource Manager 140. If other resources are determined to be necessary in step 210, then operation returns to step 204. If other resources are not required in step 210, then startup operation has completed and operation is turned over to the user.

ViOpen Operation

Figure 17A:
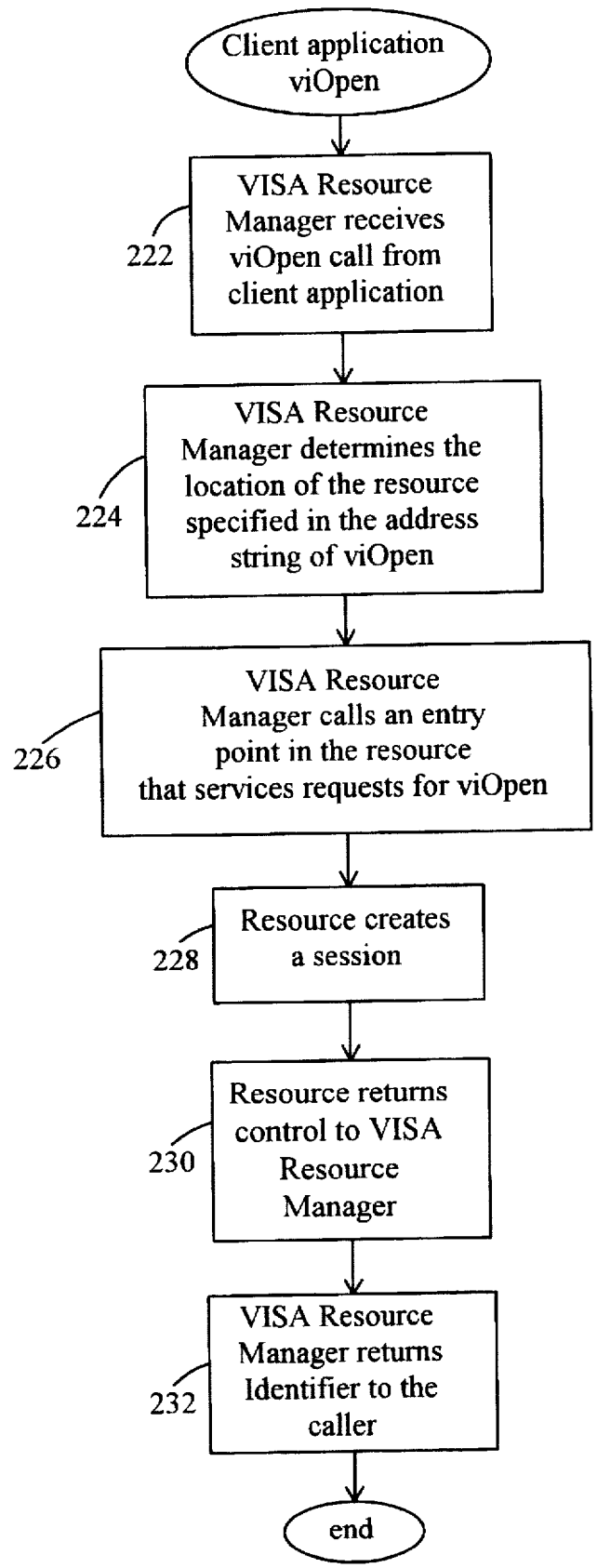
FIG. 17A is a flowchart diagram illustrating the steps performed by a VISA system when a client application uses the ViOpen operation.
Figure 17B:
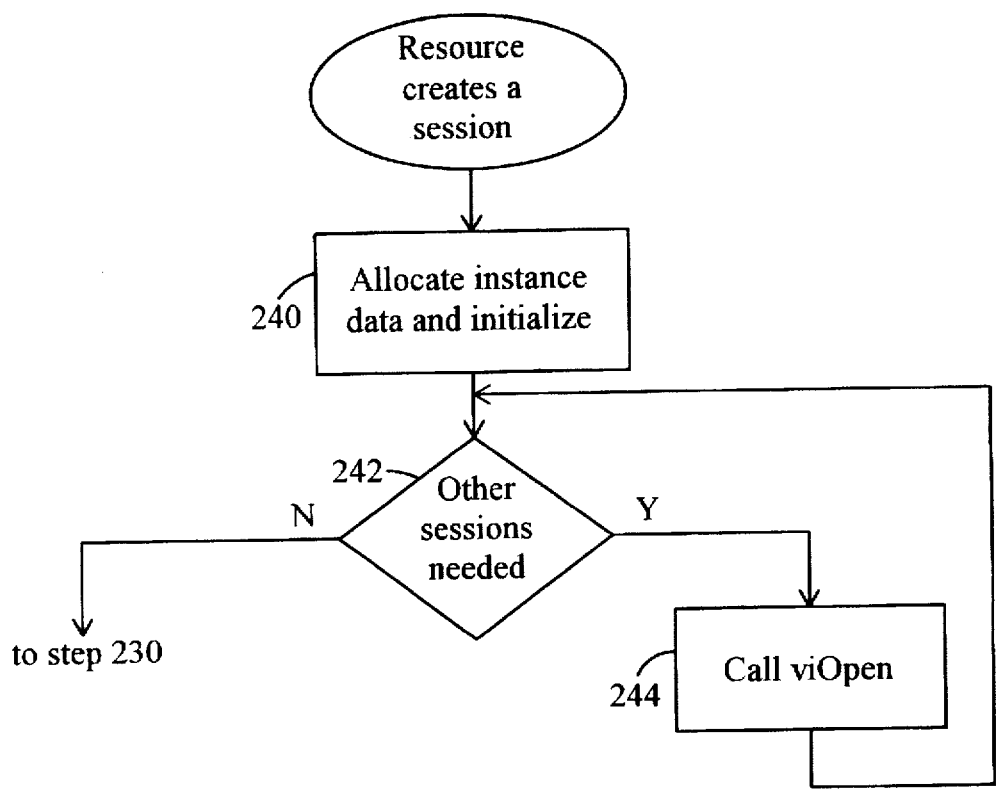
FIG. 17B is a flowchart diagram of a resource creating a session performed in step of FIG. 17A.

FIGS. 17A–B illustrate operation when a client application begins using the resources within a VISA system according to the present invention. Referring now to FIGS. 17A–B, a diagram illustrating operation of a VISA system when a ViOpen instruction is received from a client application is shown. A client begins an application or session with a ViOpen instruction. The ViOpen instruction instructs the VISA Resource Manager 140 to connect the user's application to a desired resource. The operation of the ViOpen operation illustrated in FIG. 17A is discussed in conjunction with FIG. 18.

Figure 18:
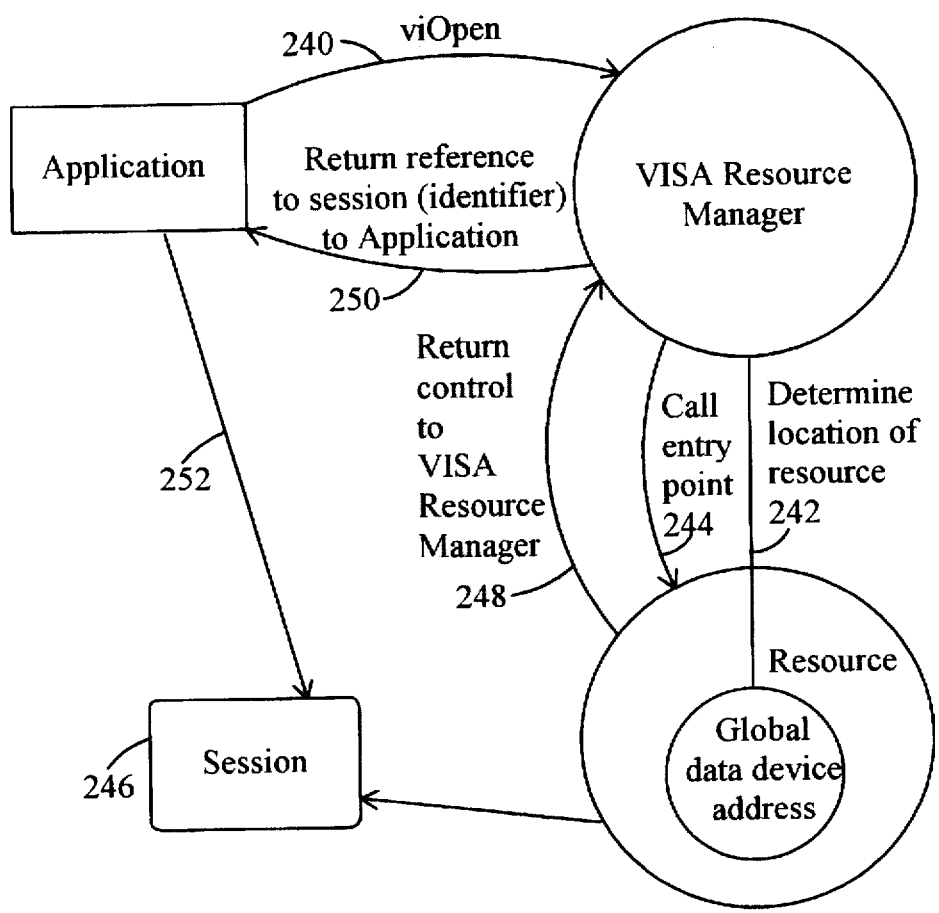
FIG. 18 illustrates the steps performed in FIG. 17A when a ViOpen operation is used.

When a system according to the present invention receives a ViOpen instruction in step 222, then in step 224 the VISA Resource Manager 140 determines the location of the resource specified in the address string of the ViOpen instruction. In FIG. 18, the client application performing a ViOpen operation on VISA Resource Manager is shown at 240, and step 124 where the VISA Resource Manager 140 determines the location of the resource is shown at 242. In step 226 the VISA Resource Manager 140 calls an entry point in the resource that services requests for the ViOpen operation. This step is illustrated at 244 in FIG. 18. In step 228 the resource creates a session, this session being shown at 246 in FIG. 18. As described above, a session is essentially an instance of a resource. Creating a session involves creating data that is needed for a particular instance of that resource.

In step 230 the resource returns control to the VISA Resource Manager 140, and this is shown at 248 in FIG. 18. In step 232 the VISA Resource Manager 140 returns a reference or identifier to the user's application. This reference is provided in the variable "session i.d." to the user application, as shown at 250 in FIG. 18. The application can then use this session i.d. value to communicate with the resource, as shown at 252 in FIG. 18.

FIG. 17B illustrates more detail regarding how a resource creates a session in step 228 of FIG. 17A. As shown, when a resource creates a session the resource allocates instance data and initializes the session in step 240. In step 242 the resource determines if other sessions are needed in step 242. If so, then ViOpen is called on those other resources in step 244 and control returns to step 242. If other sessions are not needed, then control advances to step 230 in FIG. 17A. It is noted that, if sessions to other resources are needed, when those sessions are actually created is indeterminate. If in order to create the data for a particular session it is first necessary to first open sessions to other resources, then these sessions are opened prior to the particular session. However, if in order to open these sessions it is necessary to first define how much space is available to create data, then these sessions may be opened after opening the particular session.

Figure 19:
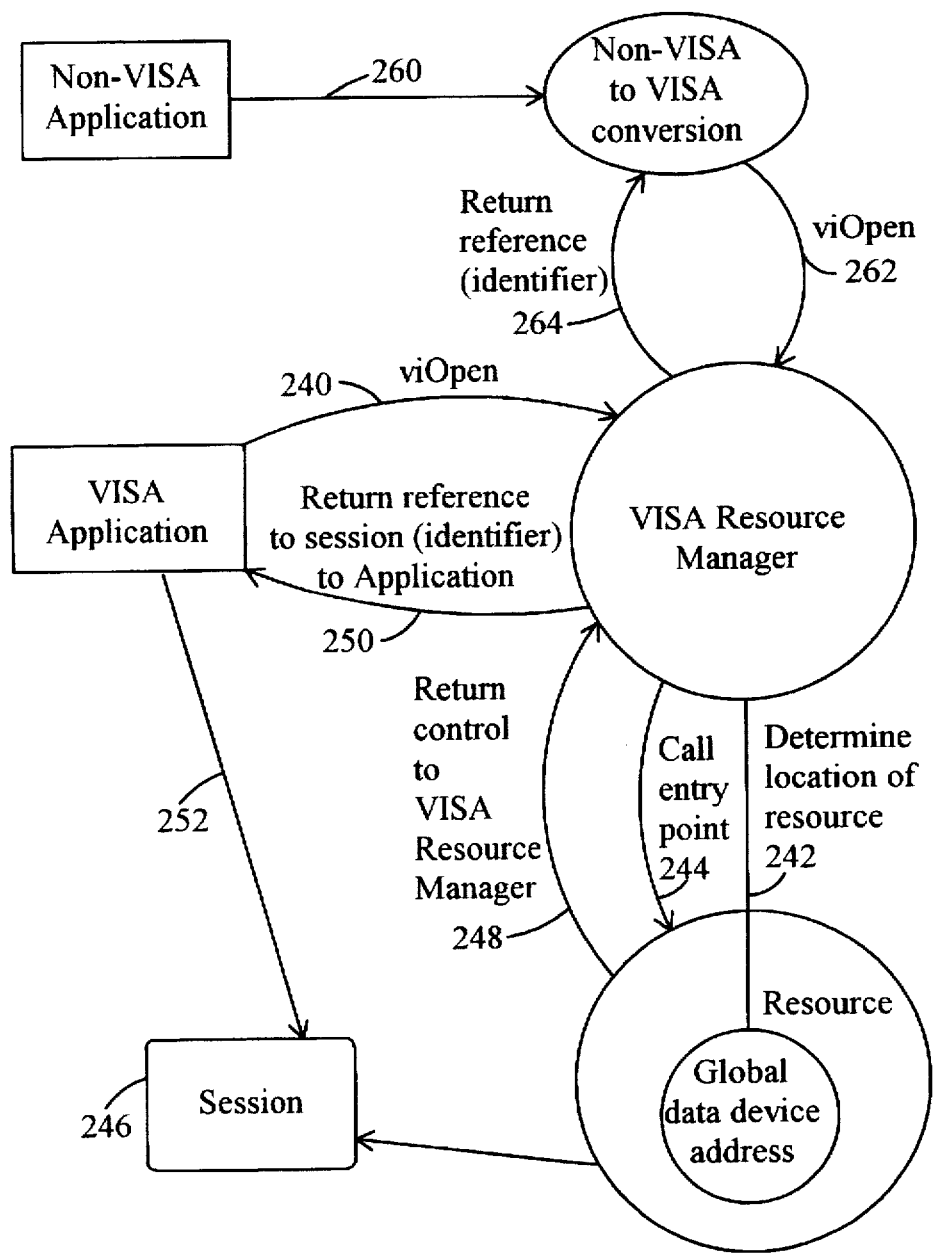
FIG. 19 is similar to FIG. 18 but also illustrates a Non-VISA to VISA conversion.

Non-VISA Application Utilizing a Mapping Library to Open a Session to VISA Resources FIG. 19 is a diagram similar to FIG. 18, but also shows how a non-VISA application, such as an application written for the SICL Driver level library, undergoes a conversion that enables it to talk to a VISA system. As shown, a non-VISA application which was developed according to a different software architecture can open sessions with VISA resources within a VISA system by means of the non-VISA to VISA conversion block, as shown. The non-VISA to VISA conversion block also receives instructions from the non-VISA application and transmits various operations to the VISA Resource Manager 140 to implement the steps in the non-VISA application.

Developer of Resources

As mentioned above, in addition to a client using a VISA system to create VISA applications, a developer can use a VISA system to develop or add resources to a VISA system according to the present invention. A new resource created by a developer can either use existing resources much the way a client uses resources as described above (a use relationship), or a new resource can derive or inherit functionality from other resources while adding additional functionality. In other words, in developing a new resource, a developer can either use existing resources within his new resource, or the developer can incorporate or inherit functionality (the interface) from existing resource classes, if resource classes exist that include functionality that the developer desires to use. Thus, the various resources provided in a VISA system can be used in new resources or incorporated into new resources to develop higher level instrument control applications, which can also be created as resources. These new resources can then serve as building blocks to create even higher level resources, and so on.

For example, if a user desired to create a resource that embodies the concept of a voltmeter, the user could develop a resource which used existing resources, i.e., included operations on existing instrument control resources, to accomplish the function. Alternatively, the user could develop a new resource that incorporated or inherited functionality from one or more existing resources, i.e., single or multiple inheritance. In the first case where the user creates the resource by using existing resources, for example, the user would start with a ViOpen operation on the instrument and then might include a Read Volt operation to the instrument which is implemented using the INSTR Resource, i.e., the operation write "read volt", and then a viRead operation using the INSTR Resource to obtain a response from the instrument. The second case where the user develops a resource that incorporates or inherits (derives) functionality from other resources involves the method described below.

Figure 20:
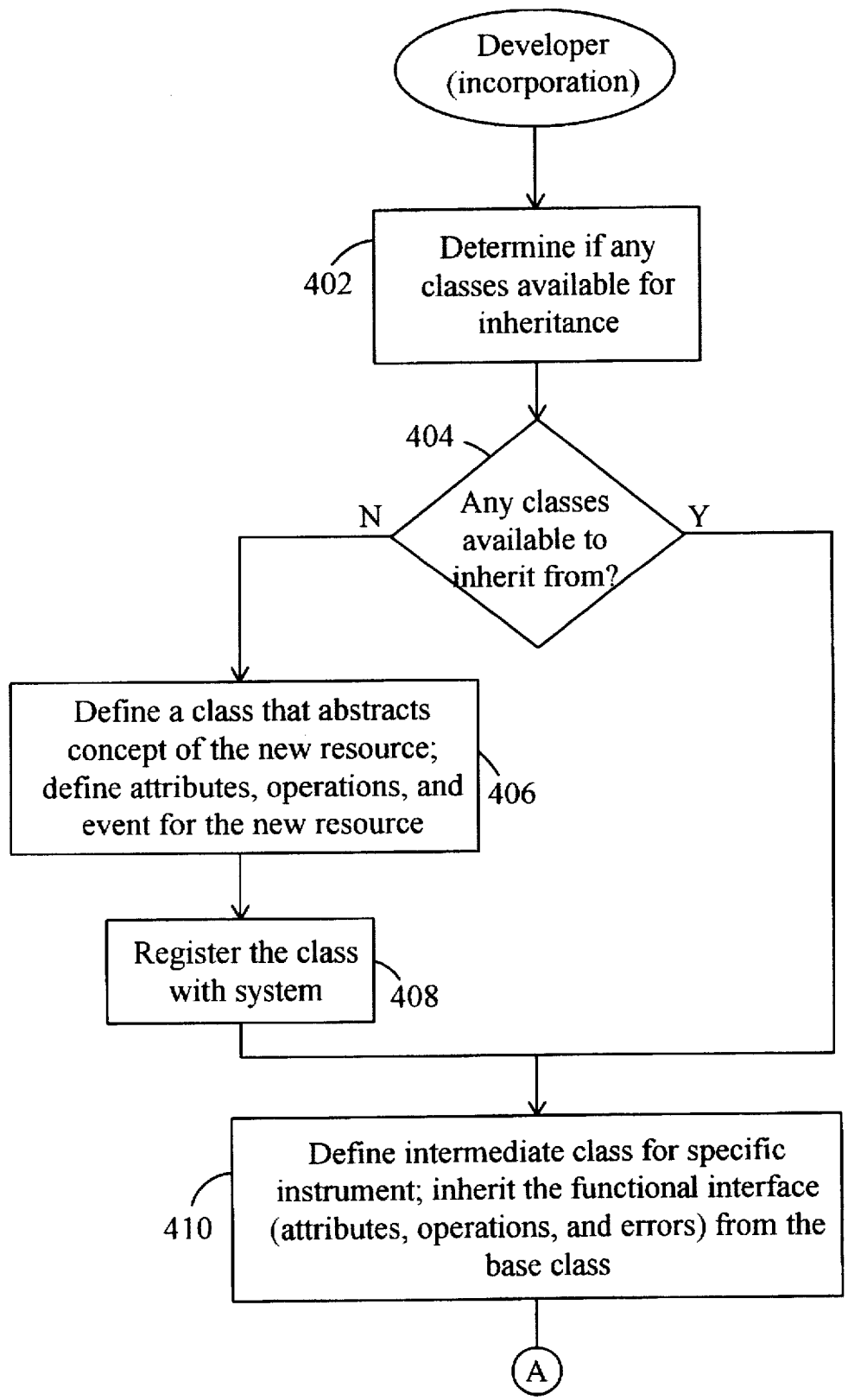
FIG. 20 illustrates operation of a developer in creating resources according to the present invention.

Referring now to FIG. 20, a flowchart diagram is shown illustrating operation when a developer develops a new resource within a VISA system that incorporates functionality from other resources. In developing a new resource, the developer will first have defined the type of functionality which he desires to implement. In step 402 the developer determines if any available classes provide capabilities which are desired for use, i.e., if any of the current resources within the VISA system provide desired functionality which can be incorporated by the resource which the developer desires to create. If there are classes available from which the developer desires to incorporate functionality in step 404, referred to as base classes, then in step 410 the developer defines a class for the specific instrument or instrument type for which he is developing the resource. This step also includes inheriting or incorporating from the base class the functional application programming interface, i.e., the attributes and operations from the base resource class. In addition, the developer specifies which events this resource can source or generate. The developer also develops the necessary code in addition to the incorporated code from the base class in order to implement the resource. For example, the developer may create code for the desired operations, attributes and events. These new operations, attributes and events may supplement or overwrite existing code in the inherited resource. When this operation has completed, the computer system is directed to perform steps 202–212 in FIG. 14, and operation would begin as shown at "A" of FIG. 14 where new resource classes have been added to the VISA system.

If in step 404 it is determined that there are no classes for which the developer desires to incorporate functionality, then in step 406 the developer defines a class that embodies the concept of the resource which is desired to be created. In other words, the developer creates code which defines and implements the attributes, operations, and events which are desired to be implemented within the resource. As discussed further below, the developer preferably inherits from base classes such as ViObject, ViSession, and ViResource. In step 408 the developer registers the class with the VISA system, i.e., with the VISA Resource Manager. Operation then advances to step 410 where the developer defines a class for the specific instrument to which the resource is being created. As mentioned above, new resources are preferably created using a CORBA 2 compliant object request broker, such as the SOM object developer toolkit available from IBM. Alternatively, a VISA system uses an OLE/COM object request broker.

A resource can be created that is specific to a particular instrument, such as an instrument having a particular instrument type and manufacturer, or a resource can be created that embodies each of the various types of capabilities for a particular type of instrument (a class of instruments of a certain type), referred to as an instrument class specific type resource. Such a resource is referred to as an instrument class specific resource because the resource is not specific to any one instrument, i.e., is not specific to a voltmeter from a certain manufacturer, but rather is specific to a class of instruments, i.e., voltmeters from a plurality of different manufacturers. In effect, an instrument class specific type resource defines a common way of handling the instrument. For example, if an instrument class specific type resource has been developed for a voltmeter, then the particular implementation of the voltmeter is irrelevant and it does not matter that on one instrument, the actual command sent is read volt and on the other one it is "RVolt" and is another implementation involves reading registers, etc. The interface merely displays an instrument class specific type resource referred to as "read volt" and how this read volt operation is actually implemented inside the resource is irrelevant. Therefore, a resource can be created which is specific to a particular type of instrument, but with an interface which is independent of manufacturer or I/O bus interface.

Once a number of instrument class specific resources have been created, the developer can then create even higher level resources that encapsulate all of the instrument class specific resources that have been created.

Figure 21:
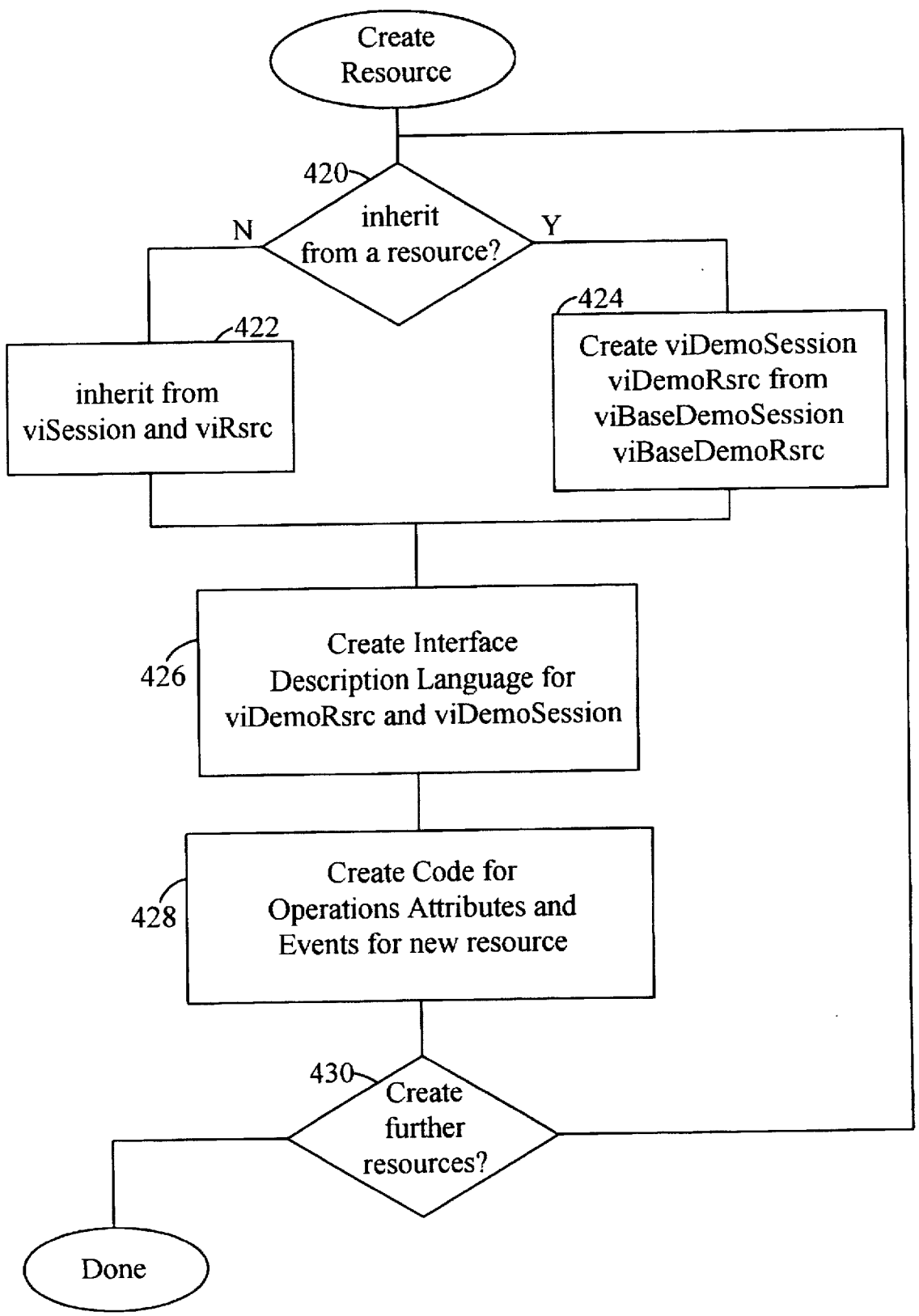
FIG. 21 is a more detailed diagram illustrating the creation of resources according to the present invention.

Referring now to FIG. 21, a more detailed flowchart diagram illustrating operation when a developer develops a new resource within the VISA system according to the present invention is shown. This flowchart presumes that the developer is attempting to create a new resource referred to as "demo". First, in step 420 the developer determines if the new demo resource desired to be created can inherit from an existing resource. If not, then in step 422 the developer inherits from the base classes of ViSession and ViResource to obtain certain core functionality. Operation then advances to step 426. If the developer determines that the new demo resource being created can inherit from an existing resource in step 420, then in step 424 the developer creates two classes referred to as ViDemoSession and ViDemoRsrc which inherit from the existing resource. In this example, the base classes being inherited from are referred to as ViBaseDemoSession and ViBaseDemoRsrc.

After either of steps 422 or 424, in step 426 the developer creates an interface description language for ViDemoRsrc and ViDemoSession. The interface description language describes the operations, attributes and events that the new demo resource being created will have. The interface description language also describes which of the operations, attributes and events will be overwritten from the parent class being inherited from and which are required to be new. The interface description language is then passed through a tool to generate a C or C++ step file, as is well known in the art. This operation may involve opening other sessions and other resources as desired, in this case creating a compound session and/or compound resource.

In step 428, the user then creates any code for operations, attributes and events for the new resource which are required and which cannot be inherited from the base or parent class. Once this operation has completed, then the developer can create a dynamic linked library (DLL) and package the DLL in a diskette as an executable. The DLL will also include in an IDL file which operates to register the new resource with the resource manager. If the developer desires to create further resources in step 430, the operation returns to step 420 and steps 420–428 repeat.

Voltmeter Example

Referring again to FIG. 21, assume that the developer desires to first create a voltmeter resource referred to as VI voltmeter that is independent of type or vendor. First, in step 420 the developer determines if the new VI voltmeter resource being created can inherit from an existing resource. Presuming that no other voltmeter resources have been created, then this decision will be negative, and in step 422 the developer inherits from ViSession and ViResource, these being the parent or base classes. In step 426, the developer then creates an interface description language for new objects referred to as VI Voltmeter Resource and VI Voltmeter Session. As noted above, this interface description language defines the operations and attributes required for the new resource. In addition, the developer specifies which events this resource can source or generate. In this voltmeter example, the interface description language may describe certain required operations, such as read volt and certain attributes are required, such as gain. In step 428 the developer creates code which performs the necessary operations, attributes, and events for the VI voltmeter class and operation then completes.

Upon creation of a VI voltmeter base class, the user may then decide to develop an instrument driver resource for a specific type of voltmeter, such as a Tektronix voltmeter. Referring again to FIG. 21, in step 420 the developer determines if the VITek voltmeter resource being created can inherit from an existing resource. In this instance, since a VI voltmeter class has been previously created, in step 424 the developer creates a VITek voltmeter session and VITek voltmeter resource inheriting from the base or parent class of VI voltmeter session and VI voltmeter resource.

In step 426 the developer creates an interface description language for the VITek voltmeter resource and the VITek voltmeter session. In this instance, a read volt operation and a gain attribute already exist in the parent class of VI voltmeter. Thus, in this example, the developer may not be required to add any further operations attributes or events. Alternatively, the developer may desire to add additional operations, such as a filter voltage operation, as well as additional attributes and events as desired. In step 428 the developer creates the necessary code for the operations attributes and events of the VITek voltmeter class being created. This may involve modifying existing code or creating additional code as desired.

Upon completion of set 428, the developer has created a VITek voltmeter resource which functions as an instrument driver for the Tektronix voltmeter. It is noted that the Tektronix voltmeter instrument driver inherited a large amount of its interface and possibly at least a portion of its implementation from the base or parent class, thus simplifying the design process. It is also noted that this same process may be used for other types of voltmeters, such as Hewlett Packard voltmeters and voltmeters from other manufacturers.

Once a plurality of instrument drivers have been created for different types of voltmeters and/or voltmeters from different manufacturers, such as a VITek voltmeter and a VIHP voltmeter, if the user application limits use of the VIHP voltmeter and the VITek voltmeter instrument driver resources to common operations, i.e., operations in the common interface of the two resources, then the user can interchange between the instrument driver resources. Since common operations, attributes and events are being used for each of the two instrument drivers, the application does not know or care which instrument driver class is being used. Thus, a user can use the same user application or user program without modification with different instrument driver resources. This allows much greater flexibility and ease of use, as well as ease of creation of instrument drivers.

It is noted that the design and definition of the common interface (base class) should not necessarily be guided by a methodology that incorporates only a subset of the available implementations, but rather should attempt to provide an interface that is as generic as possible. In other words, when designing an oscilloscope interface class, for example, the developer should design the optimum I/O interface which is not limited by functionality available in current existing oscilloscopes. Thus the developer should create a superset class of functionality, rather than a subset. The developer may then not implement certain functionality when creating a manufacturer-specific implementation. This is presently preferred over creating a limited functional interface that includes only common interface features and then having to add implementation for each instrument or resource manufacturer. Only functionality that is particular to a given instrument should be added to the definition for each derived instrument class. Functionality that is general to the concept of a particular instrument type, such as an oscilloscope, should be provided at the base level.

It is noted that the user or developer may create a resource that is an instrument driver for controlling a certain instrument. The user or developer may also create a generic instrument driver resource that including an interface adapted to control a certain class of instruments. Further, the user or developer may create an application resource, such as an application resource for controlling one or more instruments in performing a particular test and measurement sequence or process control sequence. Various types of instrumentation application resources may be created, as desired.

In one embodiment of a VISA system, the client applications or resources, such as instrument drivers, that are available within the system appear on the screen as objects or icons, depending upon the particular instruments available in the instrumentation system. The user may then combine various resources to create virtual instruments. For example, if the instrumentation system includes a digital oscilloscope resource class and a logic analyzer resource class, the user could use the digital oscilloscope and the logic analyzer to create a mixed mode signal analyzer. The user or developer combines the oscilloscope resource and the logic analyzer resource by simply drawing the relationship on the screen and then writing the higher level application in any standard programming language. Further, a VISA system according to the present invention can be used with existing applications software, such as LabVIEW from National Instruments to create higher level virtual instruments.

Conclusion

Therefore, a system and method for creating higher level resources, including instrument driver resources and application resources, is shown and described. Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

We claim:

1. A method for creating an instrument driver resource for controlling an instrument in an instrumentation system, wherein the instrumentation system comprises a computer system and one or more instruments coupled to the computer system, the method comprising:

providing one or more resource templates which comprise functionality used in controlling and communicating with resources;

providing a plurality of instrument control resources for controlling instrument device capabilities of said one or more instruments, wherein each of said plurality of instrument control resources derive functionality from one or more said resource templates;

providing a resource manager resource for providing user control, communication and access to said plurality of instrument control resources, wherein said resource manager resource derives functionality from at least one of said one or more resource templates;

determining if an instrument driver resource being created can inherit functionality from one or more of said plurality of instrument control resources;

the instrument driver resource inheriting functionality from one or more of said plurality of instrument control resources in response to said determining that the instrument driver resource can inherit from one or more of said plurality of instrument control resources; and constructing the instrument driver resource after said inheriting from said one or more of said plurality of instrument control resources, wherein the instrument driver resource provides instrumentation system control of at least one of said one or more instruments, wherein said instrument driver resource uses one or more of said plurality of instrument control resources to control the instrumentation system, wherein said constructing is in response to user input.

2. The method of claim 1, further comprising:

the instrument driver resource inheriting functionality from a session class and a resource class if the instrument driver resource cannot inherit functionality from one or more of said plurality of instrument control resources.

3. The method of claim 1, wherein said constructing the instrument driver resource comprises:

creating a session class and a resource class for the instrument driver resource in response to said inheriting, wherein the session class includes communication services, characteristic control services, and life cycle services, and wherein the resource class includes life cycle control of sessions.

4. The method of claim 1, wherein said constructing the instrument driver resource includes:
   constructing an interface description language which defines operations and attributes of said instrument driver resource.

5. The method of claim 1, wherein said instrument control resources derive functionality from one or more of said resource templates.

6. The method of claim 1, wherein said one or more instruments comprise a class of instruments of a certain type;
   wherein said constructing the instrument driver resource comprises constructing an instrument driver resource class;
   wherein said instrument driver resource class controls functions of said class of instruments of said certain type.

7. The method of claim 1, wherein said one or more instruments comprise a class of instruments of a certain type, the method further comprising:
   creating a base instrument driver resource prior to said inheriting from one or more of said plurality of instrument control resources, wherein said base instrument driver resource controls instruments of said certain type;
   wherein said inheriting from said one or more of said plurality of instrument control resources includes inheriting from said base instrument driver resource.

8. The method of claim 7, wherein said base instrument driver resource includes a first functionality for controlling said instruments of said certain type;
   wherein said constructing the instrument driver resource further comprises implementing only a portion of said first functionality of said base instrument driver resource in said instrument driver resource being constructed to control said at least one of said one or more instruments.

9. The method of claim 7, wherein the instrument driver resource comprises a voltmeter instrument driver resource.

10. The method of claim 9, wherein said base instrument driver resource comprises a voltmeter instrument driver resource, wherein said voltmeter instrument driver resource controls voltmeters from a plurality of different manufacturers.

11. An instrument driver development system for creating an instrument driver resource for controlling an instrument in an instrumentation system, wherein the instrumentation system comprises:
   a computer system including a CPU and memory;
   one or more instruments coupled to the computer system for performing test and measurement functions;
   one or more resource templates stored in the memory of the computer system which comprise functionality used in controlling and communicating with resources;
   a plurality of instrument control resources stored in the memory of the computer system for controlling instrument device capabilities of said one or more instruments, wherein each of said plurality of instrument control resources derive functionality from one or more said resource templates;
   a resource manager stored in the memory of the computer system for providing user control, communication and access to said plurality of instrument control resources, wherein said resource manager derives functionality from at least one of said one or more resource templates;
   means for creating an instrument driver resource, wherein the instrument driver resource is stored in the memory of the computer system, wherein said means for creating includes:
      inheriting means for deriving functionality from one or more of said plurality of instrument control resources and including said derived functionality in said instrument driver resource being created, wherein said inheriting means operates in response to a user determining that the instrument driver resource can inherit from one or more of said plurality of instrument control resources; and
   wherein the instrument driver resource provides instrumentation system control of at least one of said one or more instruments, wherein said instrument driver resource uses one or more of said plurality of instrument control resources to control the instrumentation system, wherein said means for creating operates in response to user input.

12. The instrument driver development system of claim 11,
   wherein said one or more resource templates include a session class and a resource class, wherein said session class includes communication services, characteristic control services, and life cycle services, and wherein the resource class includes life cycle control of sessions;
   wherein said inheriting means derives functionality from said session class and said resource class and includes said derived functionality in said instrument driver resource being created if the instrument driver resource cannot inherit from one or more of said plurality of instrument control resources.

13. The instrument driver development system of claim 12, wherein means for creating the instrument driver resource further comprises:
   means for creating a session class and a resource class for the instrument driver resource, wherein said session class and said resource class for the instrument driver resource inherit functionality from said session class and said resource class comprised in said one or more resource templates.

14. The instrument driver development system of claim 11, wherein said means for creating the instrument driver resource comprises:
   means for creating an interface description language which defines operations and attributes of said instrument driver resource.

15. The instrument driver development system of claim 11, wherein said instrument control resources derive functionality from one or more of said resource templates.

16. The instrument driver development system of claim 11, wherein said one or more instruments comprise a class of instruments of a certain type, the system further comprising:
   an instrument driver resource class stored in the memory of the computer system which controls functions of said class of instruments of said certain type.

17. The instrument driver development system of claim 16, wherein said means for creating includes means for creating said instrument driver resource class which controls functions of said class of instruments of said certain type.

18. The instrument driver development system of claim 11, wherein said one or more instruments comprise a class of instruments of a certain type, the system further comprising:

a base instrument driver resource stored in the memory of the computer system which controls instruments of said certain type;

wherein said inheriting means derives functionality from said base instrument driver resource and includes said derived functionality in said instrument driver resource being created.

19. The instrument driver development system of claim 18, wherein said base instrument driver resource includes a first functionality for controlling said instruments of said certain type;

wherein said means for creating the instrument driver resource implements only a portion of said first functionality of said base instrument driver resource in said instrument driver resource being constructed to control said at least one of said one or more instruments.

20. A method for creating an application resource for controlling one or more instruments in an instrumentation system, wherein the instrumentation system comprises a computer system having memory and one or more instruments coupled to the computer system, the method comprising:

providing one or more resource templates in the memory of the computer system which comprise functionality used in controlling and communicating with resources;

providing a plurality of instrument control resources in the memory of the computer system for controlling instrument device capabilities of said one or more instruments, wherein each of said plurality of instrument control resources derive functionality from one or more said resource templates;

providing a resource manager in the memory of the computer system for providing user control, communication and access to said plurality of instrument control resources, wherein said resource manager derives functionality from at least one of said one or more resource templates;

determining if an application resource being created can inherit functionality from one or more of said plurality of instrument control resources;

the application resource inheriting functionality from one or more of said plurality of instrument control resources in response to said determining that the application resource can inherit from one or more of said plurality of instrument control resources; and constructing the application resource after said inheriting from said one or more of said plurality of instrument control resources, wherein the application resource provides instrumentation system control of at least one of said one or more instruments, wherein said application resource uses one or more of said plurality of instrument control resources to control the instrumentation system, wherein said constructing is in response to user input.

21. The method of claim 20, further comprising:

the application resource inheriting functionality from a session class and a resource class if the application resource cannot inherit functionality from one or more of said plurality of instrument control resources.

22. The method of claim 20, wherein said constructing the application resource comprises:

creating a session class and a resource class for the application resource in response to said inheriting, wherein the session class includes communication services, characteristic control services, and life cycle services, and wherein the resource class includes life cycle control of sessions.

23. The method of claim 20, wherein said constructing the application resource includes:

constructing an interface description language which defines operations and attributes of said application resource.

24. The method of claim 20, wherein said instrument control resources derive functionality from one or more of said resource templates.

25. An instrumentation application development system for creating an application resource for controlling one or more instruments in an instrumentation system, wherein the instrumentation system comprises:

a computer system including a CPU and memory;

one or more instruments coupled to the computer system for performing test and measurement functions;

one or more resource templates stored in the memory of the computer system which comprise functionality used in controlling and communicating with resources;

a plurality of instrument control resources stored in the memory of the computer system for controlling instrument device capabilities of said one or more instruments, wherein each of said plurality of instrument control resources derive functionality from one or more said resource templates;

a resource manager stored in the memory of the computer system for providing user control, communication and access to said plurality of instrument control resources, wherein said resource manager derives functionality from at least one of said one or more resource templates;

means for creating an application resource, wherein the application resource is stored in the memory of the computer system, wherein said means for creating includes:

inheriting means for deriving functionality from one or more of said plurality of instrument control resources and including said derived functionality in said application resource being created, wherein said inheriting means operates in response to a user determining that the application resource can inherit from one or more of said plurality of instrument control resources; and wherein the application resource provides instrumentation system control of at least one of said one or more instruments, wherein said application resource uses one or more of said plurality of instrument control resources to control the instrumentation system, wherein said means for creating operates in response to user input.

26. The instrumentation application development system of claim 25, wherein said one or more resource templates include a session class and a resource class, wherein said session class includes communication services, characteristic control services, and life cycle services, and wherein the resource class includes life cycle control of sessions;

wherein said inheriting means derives functionality from said session class and said resource class and includes said derived functionality in said application resource being created if the application resource cannot inherit from one or more of said plurality of instrument control resources.

27. The instrumentation application development system of claim 26, wherein said means for creating the application resource further comprises:

means for creating a session class and a resource class for the application resource, wherein said session class and said resource class for the application resource inherit functionality from said session class and said resource class comprised in said one or more resource templates.

28. The instrumentation application development system of claim 25, wherein said means for creating the application resource comprises:

means for creating an interface description language which defines operations and attributes of said application resource.

29. The instrumentation application development system of claim 25, wherein said instrument control resources derive functionality from one or more of said resource templates.

30. A computer-readable storage media comprising program instructions for creating an instrument driver resource for controlling an instrument in an instrumentation system, wherein the instrumentation system comprises a computer system and one or more instruments coupled to the computer system;

wherein the computer-readable storage media stores one or more resource templates which comprise functionality used in controlling and communicating with resources;

wherein the computer-readable storage media stores a plurality of instrument control resources for controlling instrument device capabilities of said one or more instruments, wherein each of said plurality of instrument control resources derive functionality from one or more said resource templates;

wherein the computer-readable storage media stores a resource manager resource for providing user control, communication and access to said plurality of instrument control resources, wherein said resource manager resource derives functionality from at least one of said one or more resource templates;

wherein the program instructions comprised on the computer-readable storage media implement the steps of:

determining if an instrument driver resource being created can inherit functionality from one or more of said plurality of instrument control resources;

the instrument driver resource inheriting functionality from one or more of said plurality of instrument control resources in response to said determining that the instrument driver resource can inherit from one or more of said plurality of instrument control resources; and constructing the instrument driver resource after said inheriting from said one or more of said plurality of instrument control resources, wherein the instrument driver resource provides instrumentation system control of at least one of said one or more instruments, wherein said instrument driver resource uses one or more of said plurality of instrument control resources to control the instrumentation system, wherein said constructing is in response to user input.

31. The computer-readable storage media of claim 30, wherein the program instructions further implement the step of:

the instrument driver resource inheriting functionality from a session class and a resource class if the instrument driver resource cannot inherit functionality from one or more of said plurality of instrument control resources.

32. The computer-readable storage media of claim 30, wherein said constructing the instrument driver resource comprises:

creating a session class and a resource class for the instrument driver resource in response to said inheriting, wherein the session class includes communication services, characteristic control services, and life cycle services, and wherein the resource class includes life cycle control of sessions.

33. The computer-readable storage media of claim 30, wherein said constructing the instrument driver resource includes:

constructing an interface description language which defines operations and attributes of said instrument driver resource.

34. The computer-readable storage media of claim 30, wherein said instrument control resources derive functionality from one or more of said resource templates.

35. The computer-readable storage media of claim 30, wherein said one or more instruments comprise a class of instruments of a certain type;

wherein said constructing the instrument driver resource comprises constructing an instrument driver resource class;

wherein said instrument driver resource class controls functions of said class of instruments of said certain type.

36. The computer-readable storage media of claim 30, wherein said one or more instruments comprise a class of instruments of a certain type, wherein the program instructions further implement the step of:

creating a base instrument driver resource prior to said inheriting from one or more of said plurality of instrument control resources, wherein said base instrument driver resource controls instruments of said certain type;

wherein said inheriting from said one or more of said plurality of instrument control resources includes inheriting from said base instrument driver resource.

37. The computer-readable storage media of claim 36, wherein said base instrument driver resource includes a first functionality for controlling said instruments of said certain type;

wherein said constructing the instrument driver resource further comprises implementing only a portion of said first functionality of said base instrument driver resource in said instrument driver resource being constructed to control said at least one of said one or more instruments.

38. The computer-readable storage media of claim 36, wherein the instrument driver resource comprises a voltmeter instrument driver resource.

39. The computer-readable storage media of claim 38, wherein said base instrument driver resource comprises a voltmeter instrument driver resource, wherein said voltmeter instrument driver resource controls voltmeters from a plurality of different manufacturers.

40. A computer-readable storage media comprising program instructions for creating an application resource for controlling one or more instruments in an instrumentation system, wherein the instrumentation system comprises a computer system having memory and one or more instruments coupled to the computer system, the method comprising:

wherein the computer-readable storage media stores one or more resource templates which comprise functionality used in controlling and communicating with resources;

wherein the computer-readable storage media stores a plurality of instrument control resources for controlling instrument device capabilities of said one or more instruments, wherein each of said plurality of instrument control resources derive functionality from one or more said resource templates;

wherein the computer-readable storage media stores a resource manager for providing user control, communication and access to said plurality of instrument control resources, wherein said resource manager derives functionality from at least one of said one or more resource templates;

wherein the program instructions comprised on the computer-readable storage media implement the steps of:

determining if an application resource being created can inherit functionality from one or more of said plurality of instrument control resources;

the application resource inheriting functionality from one or more of said plurality of instrument control resources in response to said determining that the application resource can inherit from one or more of said plurality of instrument control resources; and constructing the application resource after said inheriting from said one or more of said plurality of instrument control resources, wherein the application resource provides instrumentation system control of at least one of said one or more instruments, wherein said application resource uses one or more of said plurality of instrument control resources to control the instrumentation system, wherein said constructing is in response to user input.

41. The computer-readable storage media of claim 40, wherein the program instructions further implement the step of:

the application resource inheriting functionality from a session class and a resource class if the application resource cannot inherit functionality from one or more of said plurality of instrument control resources.

42. The computer-readable storage media of claim 40, wherein said constructing the application resource comprises:

creating a session class and a resource class for the application resource in response to said inheriting, wherein the session class includes communication services, characteristic control services, and life cycle services, and wherein the resource class includes life cycle control of sessions.

43. The computer-readable storage media of claim 40, wherein said constructing the application resource includes:

constructing an interface description language which defines operations and attributes of said application resource.

44. The computer-readable storage media of claim 40, wherein said instrument control resources derive functionality from one or more of said resource templates.

* * * * *